US009644485B2

(12) United States Patent
Otomo et al.

(10) Patent No.: US 9,644,485 B2
(45) Date of Patent: May 9, 2017

(54) GAS TURBINE BLADE WITH COOLING PASSAGES

(71) Applicant: MITSUBISHI HITACHI POWER SYSTEMS, LTD., Kanagawa (JP)

(72) Inventors: Hiroyuki Otomo, Yokohama (JP); Masamitsu Kuwabara, Yokohama (JP)

(73) Assignee: MITSUBISHI HITACHI POWER SYSTEMS, LTD., Kanagawa (JP)

(*) Notice: Subject to any disclaimer, the term of this patent is extended or adjusted under 35 U.S.C. 154(b) by 0 days.

(21) Appl. No.: 14/893,677

(22) PCT Filed: Jun. 5, 2015

(86) PCT No.: PCT/JP2015/066367
§ 371 (c)(1),
(2) Date: Nov. 24, 2015

(87) PCT Pub. No.: WO2015/198840
PCT Pub. Date: Dec. 30, 2015

(65) Prior Publication Data
US 2016/0177751 A1    Jun. 23, 2016

(30) Foreign Application Priority Data

Jun. 27, 2014 (JP) ................................. 2014-132866

(51) Int. Cl.
*F01D 25/12* (2006.01)
*F01D 5/30* (2006.01)
(Continued)

(52) U.S. Cl.
CPC ............ *F01D 5/3023* (2013.01); *F01D 5/02* (2013.01); *F01D 5/18* (2013.01); *F01D 5/187* (2013.01);
(Continued)

(58) Field of Classification Search
CPC .......... F01D 5/186; F01D 5/187; F01D 25/12; F05D 2240/81; F05D 2260/202;
(Continued)

(56) References Cited

U.S. PATENT DOCUMENTS

| 5,382,135 A | 1/1995 | Green |
| 6,071,075 A | 6/2000 | Tomita et al. |

(Continued)

FOREIGN PATENT DOCUMENTS

| CN | 1611748 | 5/2005 |
| CN | 1869409 | 11/2006 |

(Continued)

OTHER PUBLICATIONS

International Search Report issued Aug. 25, 2015 in corresponding International Application No. PCT/JP2015/066367 (with English translation).

(Continued)

*Primary Examiner* — Gerald L Sung
*Assistant Examiner* — Marc Amar
(74) *Attorney, Agent, or Firm* — Wenderoth, Lind & Ponack, L.L.P.

(57) ABSTRACT

A blade is formed with blade air passages connecting the inside of a blade body of the blade and the inside of a platform of the blade. The platform is formed with pressure side passages that extend from the blade air passages toward a circumferential pressure side, are open at a pressure side end face, and are arranged in an axial direction. Further, the platform is formed with a suction side main passage into which cooling air flows, and a suction side passage that communicates with the suction side main passage and extends from the suction side main passage along a suction side end face.

4 Claims, 18 Drawing Sheets

(51) Int. Cl.
   *F01D 5/18* (2006.01)
   *F01D 5/02* (2006.01)
   *F02C 7/18* (2006.01)
   *F02C 3/04* (2006.01)

(52) U.S. Cl.
   CPC ............... *F01D 25/12* (2013.01); *F02C 3/04* (2013.01); *F02C 7/18* (2013.01); *F05D 2240/81* (2013.01); *F05D 2260/204* (2013.01)

(58) Field of Classification Search
   CPC ........ F05D 2260/204; F02C 6/08; F02C 7/12; F02C 7/18
   See application file for complete search history.

(56) References Cited

U.S. PATENT DOCUMENTS

| | | | |
|---|---|---|---|
| 6,190,130 | B1 | 2/2001 | Fukue et al. |
| 6,196,799 | B1* | 3/2001 | Fukue ............... F01D 5/186 416/97 R |
| 6,783,323 | B2* | 8/2004 | Tomita ............... F01D 5/18 415/115 |
| 7,416,391 | B2 | 8/2008 | Veltre et al. |
| 7,600,972 | B2* | 10/2009 | Benjamin ........... F01D 5/187 29/889.21 |
| 8,794,921 | B2* | 8/2014 | Ellis ................ F01D 5/087 29/525 |
| 2005/0058545 | A1 | 3/2005 | Cardenas |
| 2005/0135925 | A1 | 6/2005 | Shiozaki et al. |
| 2006/0269409 | A1* | 11/2006 | Torii ............... F01D 5/187 416/97 R |
| 2012/0107134 | A1* | 5/2012 | Harris, Jr. ......... F01D 5/081 416/97 R |
| 2012/0177479 | A1 | 7/2012 | Azad et al. |
| 2012/0263603 | A1 | 10/2012 | Hada |
| 2012/0315150 | A1* | 12/2012 | Umehara ........... F01D 5/187 416/97 R |
| 2013/0259704 | A1* | 10/2013 | Zhang ............... F01D 5/081 416/97 R |
| 2014/0064984 | A1* | 3/2014 | Zhang ............... F01D 5/187 416/97 R |

FOREIGN PATENT DOCUMENTS

| | | |
|---|---|---|
| CN | 101473107 | 7/2009 |
| CN | 102454427 | 5/2012 |
| CN | 103184893 | 7/2013 |
| CN | 103184894 | 7/2013 |
| CN | 204827542 | 12/2015 |
| DE | 10 2006 004 437 | 11/2006 |
| DE | 10 2011 054 880 | 5/2012 |
| EP | 1 275 819 | 1/2003 |
| EP | 2 610 435 | 7/2013 |
| JP | 11-166401 | 6/1999 |
| JP | 11-236805 | 8/1999 |
| JP | 11-247609 | 9/1999 |
| JP | 2000-034902 | 2/2000 |
| JP | 3110275 | 11/2000 |
| JP | 2001-271603 | 10/2001 |
| JP | 2004-044497 | 2/2004 |
| JP | 2007-154898 | 6/2007 |
| JP | 2007-224919 | 9/2007 |
| JP | 2008-202547 | 9/2008 |
| JP | 2009-047177 | 3/2009 |
| JP | 2011-241836 | 12/2011 |
| JP | 2013-139772 | 7/2013 |
| JP | 5291837 | 9/2013 |
| JP | 2014-047786 | 3/2014 |
| JP | 5606648 | 10/2014 |
| WO | 2012/140806 | 10/2012 |

OTHER PUBLICATIONS

Written Opinion of the International Searching Authority issued Aug. 25, 2015 in corresponding International Application No. PCT/JP2015/066367 (with English translation).
Notice of Allowance issued Jul. 29, 2014 in corresponding Japanese Application No. 2014-132866 (with English translation).
Notice of Allowance issued Feb. 19, 2016 in corresponding Korean Application No. 10-2015-7031752 (with English translation).
First Office Action dated Jun. 3, 2016 issued in corresponding Chinese Patent Application No. 201510351053.2 (with English translation).
Extended European Search Report issued Oct. 19, 2016 in corresponding European Patent Application No. 15794807.6.
Chinese Office Action issued Dec. 21, 2016 in Application No. 201510351053.2 (with English translation).

* cited by examiner

GAS TURBINE BLADE WITH COOLING PASSAGES

TECHNICAL FIELD

The present invention relates to a blade and a gas turbine provided with the same. Priority is claimed from Japanese Patent Application No. 2014-132866, filed on Jun. 27, 2014, the contents of which are incorporated herein by reference.

BACKGROUND ART

The rotor of a gas turbine has a rotor shaft and a plurality of blades mounted on the rotor shaft. Each of the blades has a blade body that extends in a radial direction of the rotor shaft, a platform that is formed at a radially inner side of the blade body and defines a part of a combustion gas flow channel through which a combustion gas flows, and a blade root that is formed at the radially inner side of the platform and is mounted on the rotor shaft.

Since the blades are exposed to a high-temperature combustion gas, for example, as described in Japanese Unexamined Patent Application, First Publication No. H11-247609 below, the blades are cooled by cooling air.

To be specific, the blade body, the platform, and the blade root are formed with a plurality of blade air passages which extend in the radial direction of the rotor shaft and connect the inside of the blade body and the inside of the platform and through which the cooling air flows. The plurality of blade air passages are arranged along a chord of the blade body. For convenience of the following description, an extending direction of the rotor shaft is defined as an axial direction, a radial direction of the rotor shaft is simply defined as a radial direction, and a circumferential direction of the rotor shaft is simply defined as a circumferential direction. Also, a side to which the combustion gas flows in the axial direction is defined as a downstream side, and the opposite side is defined as an upstream side. Further, a suction side of the blade body in the circumferential direction is defined as a circumferential suction side, and a pressure side of the blade body in this circumferential direction is defined as a circumferential pressure side.

The platform of an example of Japanese Unexamined Patent Application, First Publication No. H11-247609 is formed with a plurality of passages that extend from the plurality of blade air passages toward the circumferential pressure side and are arranged in the axial direction. All of the plurality of passages are open at an end face of the platform at the circumferential pressure side. Further, this platform is formed with a plurality of passages that extend from the plurality of blade air passages toward the circumferential suction side and are arranged in the axial direction. All of the plurality of passages are open at an end face of the platform at the circumferential suction side.

Also, the platform of another example of Japanese Unexamined Patent Application, First Publication No. H11-247609 is formed with a passage that extends from a first blade air passage at the most upstream side among the plurality of blade air passages toward the circumferential pressure side and then extends along the end face of the platform at the circumferential pressure side toward an axially downstream side. This passage is open at an end face of the platform at the axially downstream side. Further, this platform is formed with a passage that extend from the first blade air passage toward the circumferential suction side and then extends along the end face of the platform at the circumferential suction side toward the axially downstream side. This passage is open at the end face of the platform at the axially downstream side.

TECHNICAL PROBLEM

It is preferable to effectively cool the blades and improve the durability thereof while reducing the usage of air for cooling the blades as much as possible.

SUMMARY OF INVENTION

Thus, the present invention is intended to provide a blade capable of suppressing the usage of cooling air while improving durability, and a gas turbine provided with the same.

TECHNICAL SOLUTION

To accomplish the above object, a blade of an aspect of the present invention is mounted at an outer circumferential side of a rotor shaft, and includes: a blade body configured to extend in a radial direction of the rotor shaft; and a platform formed at a radially inner side of the blade body and configured to define the radially inner side of a combustion gas flow channel through which a combustion gas flows. The blade body and the platform are formed with blade air passages which extend in the radial direction and connect an inside of the blade body and an inside of the platform and through which cooling air flows, and the platform is formed with a rear end face that is an end face at an axially downstream side in an axial direction in which the rotor shaft extends and in which the combustion gas flows, a front end face that is an end face at an axially upstream side opposite to the axially downstream side, a pressure side end face that is an end face at a circumferential pressure side that is a pressure side of the blade body in a circumferential direction of the rotor shaft, and a suction side end face that is an end face at a circumferential suction side opposite to the circumferential pressure side. The platform is formed with a plurality of pressure side passages that extend from the blade air passages toward the circumferential pressure side, are open at the pressure side end face, and are arranged in the axial direction, a suction side main passage into which the cooling air flows and which is a main passage whose end is located at the circumferential suction side from the blade body, and a suction side passage that communicates with the suction side main passage and extends from the suction side main passage along the suction side end face in a direction having a component of the axial direction.

In this blade, the plurality of pressure side passages are formed in the portion located within the platform at the circumferential pressure side, and the flow rate of the cooling air cooling this portion is increased to suppress thermal stress of this portion. On the other hand, the portion located within the platform at the circumferential suction side is formed with the suction side main passage and the suction side passage communicating with this suction side main passage, and the flow rate of the cooling air cooling this portion is reduced.

Here, in the blade, each of cross-sectional areas of the plurality of pressure side passages may be smaller than a cross-sectional area of the suction side passage, and the sum of the cross-sectional areas of the plurality of pressure side passages may be greater than the cross-sectional area of the suction side passage.

In this blade, each of the cross-sectional areas of the plurality of pressure side passages is made smaller than the cross-sectional area of the suction side passage while the flow rate of the cooling air cooling the portion located within the platform at the circumferential pressure side is increased. Thereby, the flow velocity of the air flowing through the plurality of pressure side passages increases, and cooling efficiency of the portion at the circumferential pressure side is improved. Here, the cross-sectional area of the passage is a cross-sectional area at a plane perpendicular to the longitudinal direction of the passage.

Also, in any of the above blades, openings of the plurality of pressure side passages may be formed at intervals from the axially upstream side to the axially downstream side of the pressure side end face, and an interval between the openings of the pressure side passages adjacent to each other at a portion of the pressure side end face at the axially upstream side may be narrower than that between the openings of the pressure side passages adjacent to each other at an intermediate portion of the pressure side end face in the axial direction.

In this blade, a portion located within the platform at the circumferential pressure side and the axially upstream side from the blade body can be cooled more than intermediate portions in the axial direction at the circumferential pressure side from the blade body.

In the blade in which the interval between the openings of the pressure side passages adjacent to each other at the portion of the pressure side end face at the axially upstream side is narrow, the openings of the pressure side passages adjacent to each other at the portion of the pressure side end face at the axially upstream side may be located at different positions from each other in the radial direction.

In this blade, the interval between the openings of the pressure side passages adjacent to each other at the portion of the pressure side end face at the axially upstream side can be widened.

Also, in any of the above blades, openings of the plurality of pressure side passages may be formed at intervals from the axially upstream side to the axially downstream side of the pressure side end face, and an interval between the openings of the pressure side passages adjacent to each other at a portion of the pressure side end face at the axially downstream side may be narrower than that between the openings of the pressure side passages adjacent to each other at an intermediate portion of the pressure side end face in the axial direction.

In this blade, a portion located within the platform at the circumferential pressure side and the axially downstream side from the blade body can be cooled more than intermediate portions in the axial direction at the circumferential pressure side from the blade body.

Also, in any of the above blades, the plurality of blade air passages extending in the radial direction may be formed in the blade body and the platform side by side along a chord of the blade body, and the platform may be formed with a front side main passage that is a main passage that extends from a first blade air passage at a most upstream side in the axial direction among the plurality of blade air passages toward the axially upstream side while being directed to the circumferential pressure side, one or more pressure front side passages that extend from the front side main passage toward the circumferential pressure side and are open at the pressure side end face, and one or more front pressure side passages that extend from the front side main passage toward the axially upstream side and are open at the front end face.

In this blade, although the number of the passages that are open at the pressure side end face of the platform at the axially upstream side and the number of the passages that are open at the front end face of the platform at the circumferential pressure side are increased, the intervals of these types of passages at a cooling air supply side can be widened. For this reason, in this blade, it is possible to increase the numbers of these types of passages and reinforce cooling of the platform while maintaining the machinability.

In the blade in which the front side main passage is formed, the plurality of pressure front side passages arranged in the axial direction may be formed in the platform, and an interval between openings of the pressure front side passages adjacent to each other at the pressure side end face may be narrower than that between the openings of the pressure side passages adjacent to each other at an intermediate portion of the pressure side end face in the axial direction.

In this blade, a portion located within the platform at the circumferential pressure side and the axially upstream side from the blade body can be cooled more than intermediate portions in the axial direction at the circumferential pressure side from the blade body.

Also, in any of the above blades in which the front side main passage is formed, the plurality of front pressure side passages arranged in the circumferential direction may be formed in the platform, and an interval between openings of the front pressure side passages adjacent to each other at the front end face may be narrower than that between the openings of the pressure side passages adjacent to each other at an intermediate portion of the pressure side end face in the axial direction.

In this blade, a portion located within the platform at the axially upstream side from the blade body can be cooled more than intermediate portions in the axial direction at the circumferential pressure side from the blade body.

Also, in any of the above blades in which the front side main passage is formed, the platform may be formed with a plurality of front side passages that extend from the first blade air passage toward the axially upstream side and are open at the front end face, and an interval between openings of the front side passages adjacent to each other at the front end face may be narrower than that between the openings of the pressure side passages adjacent to each other at an intermediate portion of the pressure side end face in the axial direction.

In this blade, a portion located within the platform at the axially upstream side from the blade body can be cooled more than intermediate portions in the axial direction at the circumferential pressure side from the blade body.

In any of the above blades in which the interval between the openings of the pressure side passages adjacent to each other at the portion of the pressure side end face at the axially upstream side is narrow, or the interval between the openings of the pressure front side passages adjacent to each other at the pressure side end face is narrow, a shortest distance between a leading edge of the blade body and the pressure side end face may be shorter than that between a suction side portion of the blade body and the suction side end face.

In the case of this blade, high thermal stress easily occurs at the portion located within the platform at the circumferential pressure side and axially upstream side from the blade body. Therefore, in this case, a constitution in which the portion at the circumferential pressure side and axially upstream side from the blade body can be cooled more than the intermediate portions in the axial direction at the circumferential pressure side from the blade body is employed. Thereby, it is possible to suppress the thermal stress of the portion at the circumferential pressure side and axially upstream side from the blade body.

In any of the above blades in which the interval between the openings of the front pressure side passages adjacent to each other at the front end face is narrow, or the interval between the openings of the front side passages adjacent to each other at the front end face is narrow, a shortest distance between a leading edge of the blade body and the front end face may be shorter than that between a suction side portion of the blade body and the suction side end face.

In the case of this blade, the portion located within the platform at the axially upstream side of the blade body easily reaches a high temperature. Therefore, in this case, a constitution in which the portion at the axially upstream side of the blade body can be cooled more than the intermediate portions in the axial direction at the circumferential pressure side from the blade body is employed. Thereby, it is possible to reduce the temperature of the portion at the axially upstream side of the blade body to suppress high-temperature oxidation of this portion.

In any of the above blades, a cross-sectional area of the suction side main passage may be greater than that of the suction side passage.

In this blade, it is possible to reduce pressure loss of the cooling air that flows into the suction side passage via the suction side main passage. Further, in this blade, since the flow velocity of the cooling air passing through the suction side passage is increased, the heat-transfer coefficient can be increased at this suction side passage. Therefore, according to this blade, it is possible to efficiently cool a suction side portion of the platform.

In any of the above blades, the plurality of blade air passages extending in the radial direction may be formed in the blade body and the platform side by side along a chord of the blade body, and the suction side main passage may extend from a first blade air passage at a most upstream side in the axial direction among the plurality of blade air passages toward the circumferential suction side.

Also, in any of the above blades, the radially inner side of the platform may be formed with a recess which is recessed toward the radially outer side at a position that is the axially upstream side and the circumferential suction side from the blade body and into which the cooling air flows, and the suction side main passage may extend from the recess toward the circumferential suction side.

Also, in any of the above blades, the plurality of blade air passages extending in the radial direction may be formed in the blade body and the platform side by side along a chord of the blade body, and the suction side main passage may extend from a second blade air passage that is the second one from the axially upstream side among the plurality of blade air passages toward the circumferential suction side.

In any of the above blades in which the suction side main passage extends from the recess or the second blade air passage, the plurality of blade air passages extending in the radial direction may be formed in the blade body and the platform side by side along a chord of the blade body, and the platform may be formed with, in addition to a first suction side main passage that is the suction side main passage and a first suction side passage that is the suction side passage, a second suction side main passage that is a main passage that extends from a first blade air passage at a most upstream side in the axial direction among the plurality of blade air passages toward the circumferential suction side, and a plurality of second suction side passages that extend from the second suction side main passage toward the suction side end face and are open at the suction side end face.

Also, in any of the above blades, the main passage may have an opening at an end face of the platform, the opening may be blocked by a lid, and the lid and an edge of the opening may be joined. The lid may be formed with a through-hole passing from an inside of the main passage to an outside of the platform.

In this blade, it is possible to cool the surroundings of the opening of the main passage within the end face of the platform. Further, in this blade, since the joined portion between the edge of the opening and the lid is also cooled, it is possible to increase the joining reliability of the joined portion.

Also, in any of the above blades, the platform may be formed with, in addition to first pressure side passages that are the pressure side passages, second pressure side passages that extend from the blade air passages toward the circumferential pressure side and are open at a gas path surface coming into contact with the combustion gas at the platform.

In this blade, the portion located within the gas path surface of the platform at the circumferential pressure side from the blade body can be subjected to film cooling.

To accomplish the above object, a gas turbine of an aspect of the present invention includes: a plurality of blades, each of which is any of the above blades; the rotor shaft on which the plurality of blades are mounted; a turbine casing configured to rotatably cover a turbine rotor having the plurality of blades and the rotor shaft; and a combustor configured to burn fuel to generate the combustion gas.

ADVANTAGEOUS EFFECTS

According to an aspect of the present invention, it is possible to suppress the usage of cooling air to improve the performance of the gas turbine while improving the durability of the blade.

DESCRIPTION OF EMBODIMENTS

Hereinafter, an embodiment and modified examples of the present invention will be described in detail with reference to the drawings.

(Embodiment of Gas Turbine)

Figure 1:
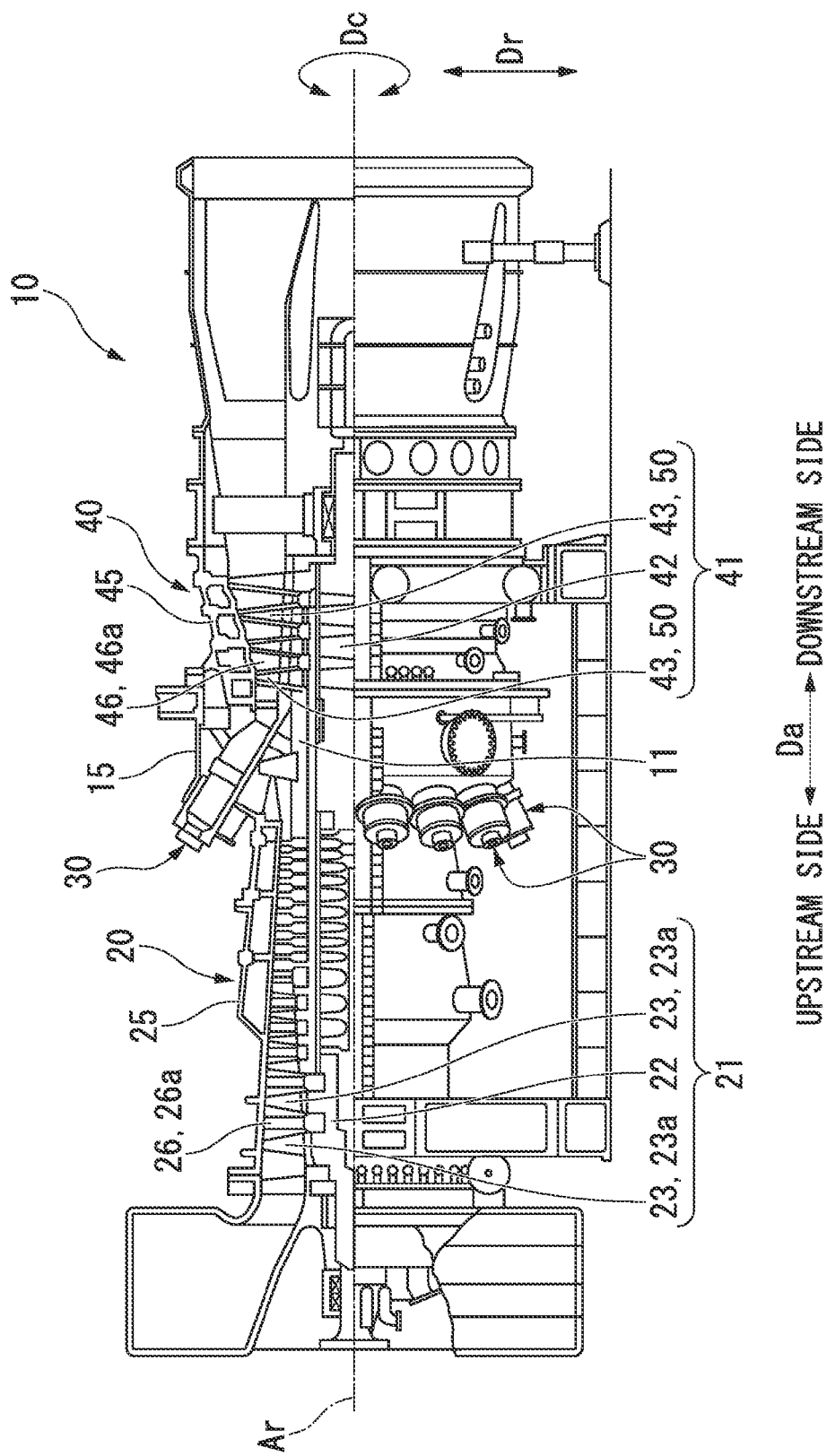
FIG. 1 shows a full side view in which major parts of a gas turbine are cut out in an embodiment according to the present invention.

An embodiment of a gas turbine will be described with reference to FIGS. 1 and 2.

A gas turbine 10 of the present embodiment is equipped with a compressor 20 compressing air, combustors 30 that burn fuel in the air compressed by the compressor 20 to generate a combustion gas, and a turbine 40 driven by the combustion gas.

The compressor 20 has a compressor rotor 21 rotating about an axis Ar, a compressor casing 25 that rotatably covers the compressor rotor 21, and a plurality of vane stages 26. The turbine 40 has a turbine rotor 41 rotating about the axis Ar, a turbine casing 45 that rotatably covers the turbine rotor 41, and a plurality of vane stages 46.

The compressor rotor 21 and the turbine rotor 41 are located on the same axis Ar, and are interconnected to form a gas turbine rotor 11. For example, a rotor of a generator (not shown) is connected to this gas turbine rotor 11. Also, the compressor casing 25 and the turbine casing 45 are interconnected to form a gas turbine casing 15. Hereinafter, a direction in which the axis Ar extends is defined as an axial direction Da, a circumferential direction centering on this axis Ar is simply defined as a circumferential direction Dc, and a direction perpendicular to the axis Ar is defined as a radial direction Dr. Also, with respect to the turbine 40 in the axial direction Da, a side of the compressor 20 is defined as an upstream side, and the opposite side is defined as a downstream side.

The compressor rotor 21 has a rotor shaft 22 that extends along the axis Ar in the axial direction Da, and a plurality of blade stages 23 that are mounted on the rotor shaft 22. The plurality of blade stages 23 are arranged in the axial direction Da. Each of the blade stages 23 is made up of a plurality of blades 23a arranged in the circumferential direction Dc. The vane stages 26 are disposed respectively on the downstream side of the plurality of blades stages 23. The vane stages 26 are provided inside the compressor casing 25. Each of the vane stages 26 is made up of a plurality of vanes 26a arranged in the circumferential direction Dc.

Figure 2:
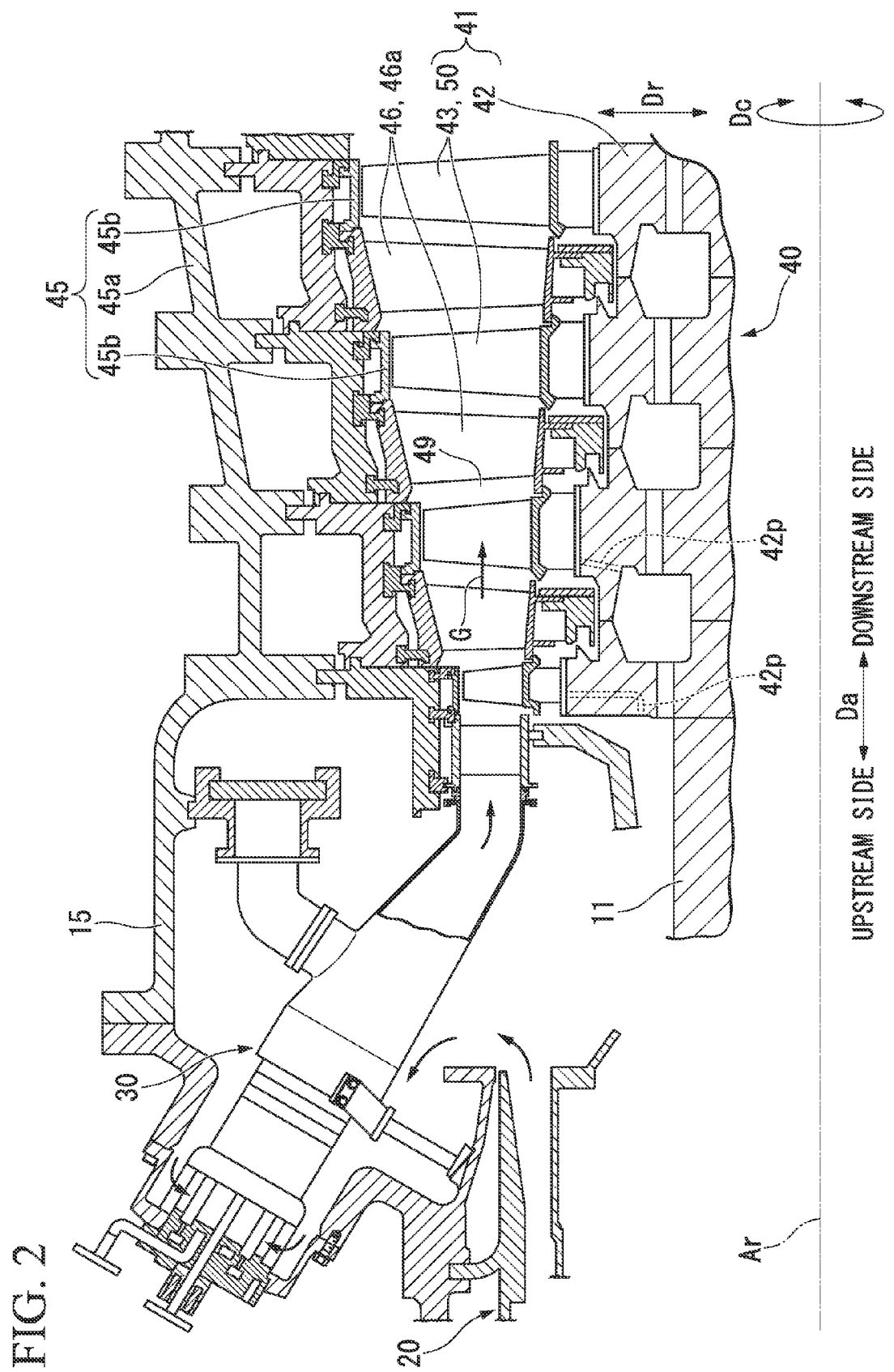
FIG. 2 shows a sectional view of the major parts of the gas turbine in the embodiment according to the present invention.

As shown in FIG. 2, the turbine rotor 41 has a rotor shaft 42 that extends along the axis Ar in the axial direction Da, and a plurality of blade stages 43 that are mounted on this rotor shaft 42. The plurality of blade stages 43 are arranged in the axial direction Da. Each of the blade stages 43 is made up of a plurality of blades 50 arranged in the circumferential direction Dc. Vane stages 46 are disposed respectively on the upstream side of the plurality of blade stages 43. The vane stages 46 are provided inside the turbine casing 45. Each of the vane stages 46 is made up of a plurality of vanes 46a arranged in the circumferential direction Dc. The turbine casing 45 has a tubular turbine casing main body 45a constituting an outer shell thereof, and a plurality of ring segments 45b fixed inside the tubular turbine casing main body 45a. All of the plurality of ring segments 45b are provided at positions between the plurality of vane stages 46. Accordingly, the blade stages 43 are disposed respectively at a radially inner side of the ring segments 45b. A combustion gas flow channel 49 through which a combustion gas G flows from the combustor 30 is formed in an annular space within a region that is between an outer circumferential side of the rotor shaft 42 and an inner circumferential side of the turbine casing 45 and within which the vanes 46a and the blades 50 are disposed in the axial direction Da. The rotor shaft 42 is formed with cooling air passages 42p through which cooling air passes. The cooling air passing through the cooling air passages 42p is introduced into the blades 50, and is used to cool the blades 50.

Figure 3:
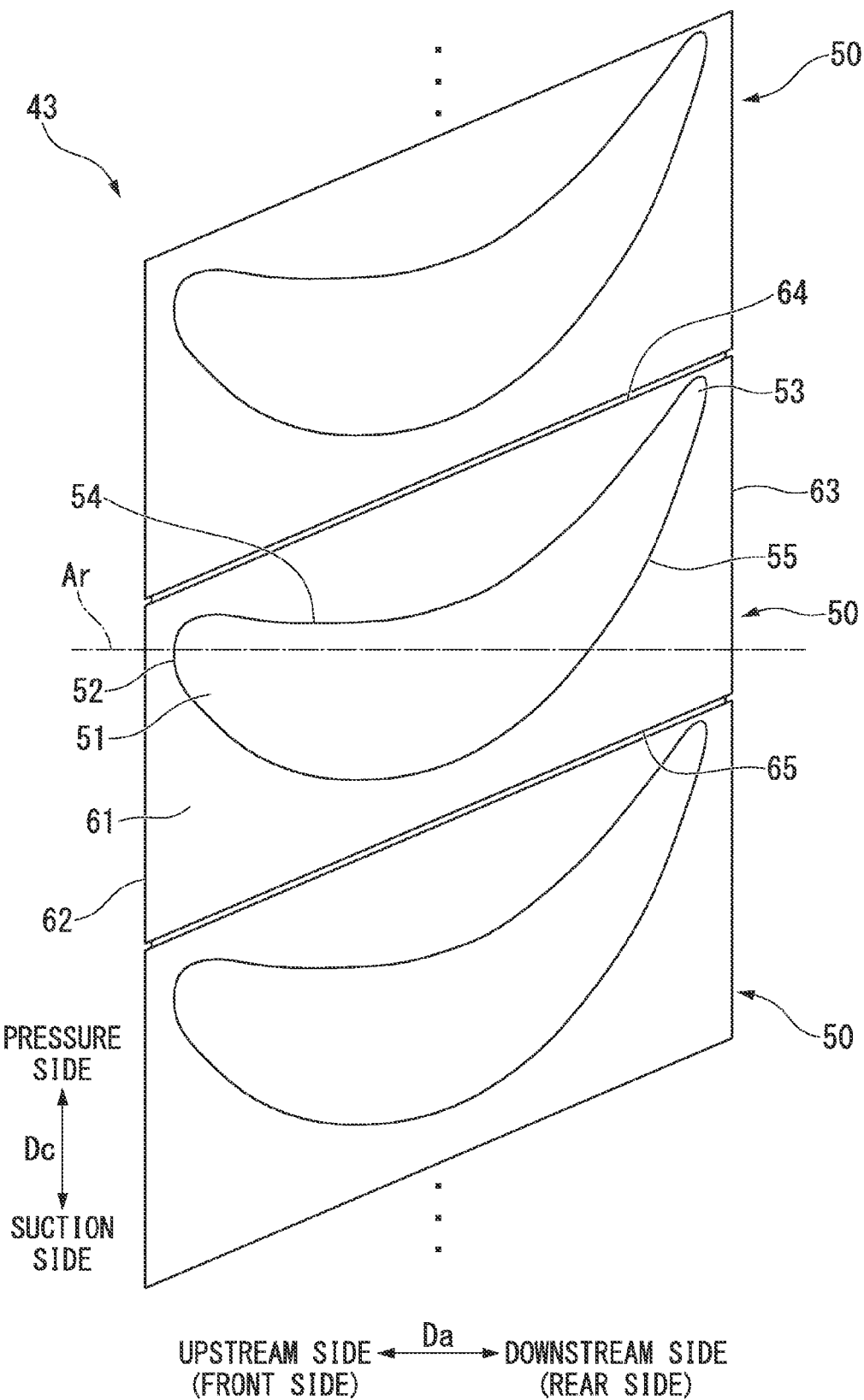
FIG. 3 shows a developed view of a blade stage in the embodiment according to the present invention.
Figure 4:
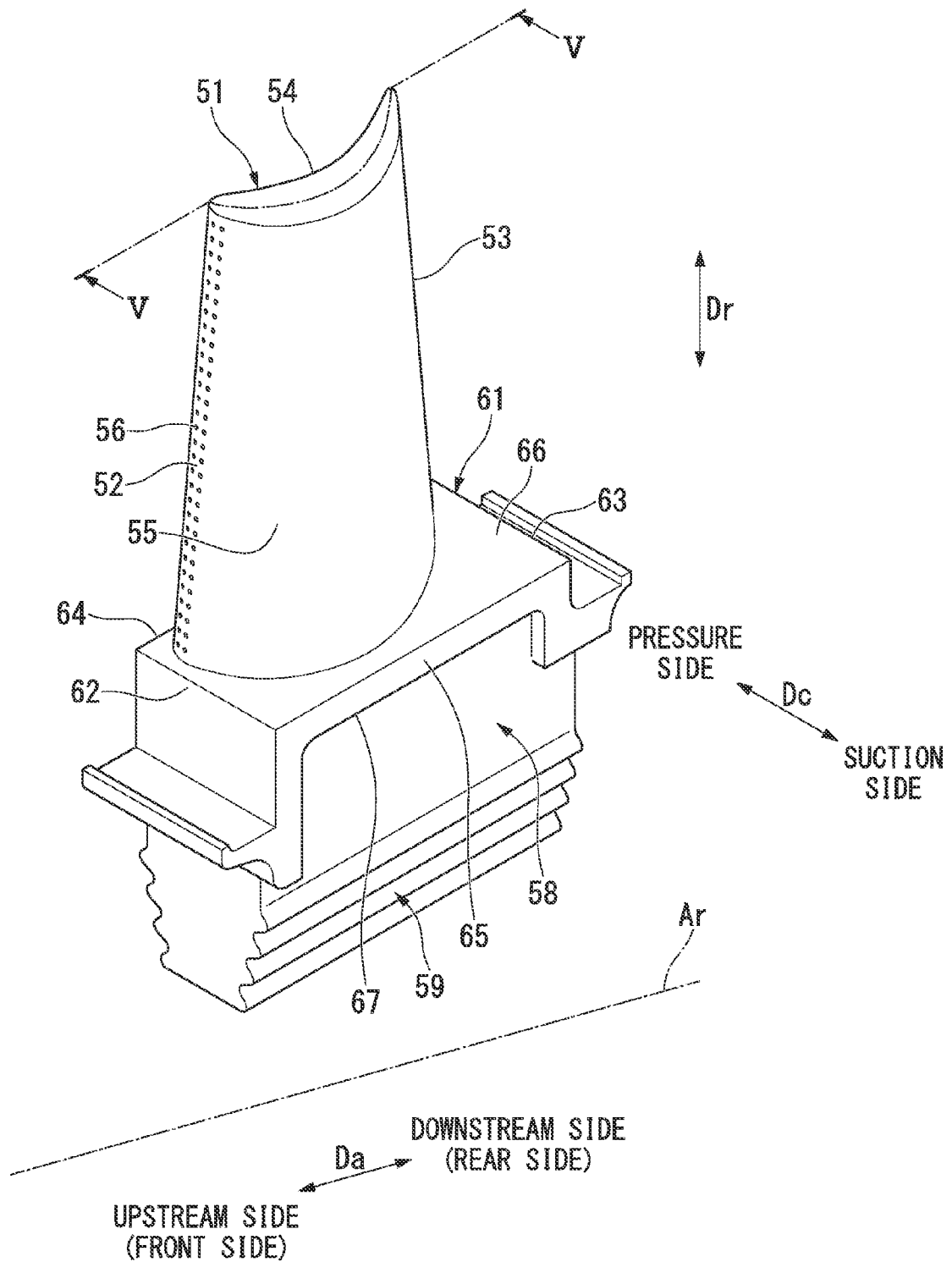
FIG. 4 shows a perspective view of a blade in the embodiment according to the present invention.

As shown in FIGS. 3 and 4, each of the blades 50 has a blade body 51 that extends in the radial direction Dr, a platform 61 that is formed at the radially inner side of the blade body 51, a shank 58 that is formed at the radially inner side of the platform 61, and a blade root 59 that is provided at the radially inner side of the shank 58. The combustion gas flow channel through which the combustion gas G passes from the combustor 30 is formed at a radially outer side from the platform 61, i.e., on a region on which the blade body 51 is present.

The blade body 51 is configured such that an end thereof at an axially upstream side forms a leading edge 52 and an end thereof at an axially downstream side forms a trailing edge 53. This blade body 51 smoothly forms a convex shape toward one side in the circumferential direction Dc. Of surfaces of the blade body 51 which are directed in the circumferential direction Dc, a convex surface forms a suction side 55, and a concave surface forms a pressure side 54. For convenience of the following description, the pressure side of the blade body 51 in the circumferential direction Dc is defined as a circumferential pressure side, and the suction side of the blade body 51 is defined as a circumferential suction side. Also, an upstream side in the axial direction Da may be referred to as a front side, and a downstream side in the axial direction Da may be referred to as a rear side.

In the blade root 59, a sectional shape perpendicular to the chord of the blade body 51 forms a Christmas tree shape in which widened portions and narrowed portions alternately repeat toward the radially inner side. The aforementioned rotor shaft 42 is formed with blade root grooves into which the blade roots 59 are tightly fitted.

The platform 61 is formed with a front end face 62 that is an end face at the axially upstream side, a rear end face 63 that is an end face at the axially downstream side, a pressure side end face 64 that is an end face at the circumferential pressure side, and a suction side end face 65 that is an end face at the circumferential suction side. The front end face 62 and the rear end face 63 are substantially parallel. Also, the pressure side end face 64 and the suction side end face 65 are substantially parallel. Accordingly, when viewed from the radial direction Dr, the platform 61 forms a parallelogram shape, as shown in FIG. 3. The platforms 61 of the blades 50 adjacent to each other in the circumferential direction Dc are configured such that the pressure side end face 64 of one platform 61 and the suction side end face 65 of the other platform 61 are opposite to each other. Also, the platform 61 is formed with a gas path surface 66 that is a surface at the radially outer side, and an inner surface 67 that is a surface at the radially inner side. The gas path surface 66 forms a part of a surface defining the combustion gas flow channel at the radially inner side, and comes into contact with the combustion gas.

Figure 5:
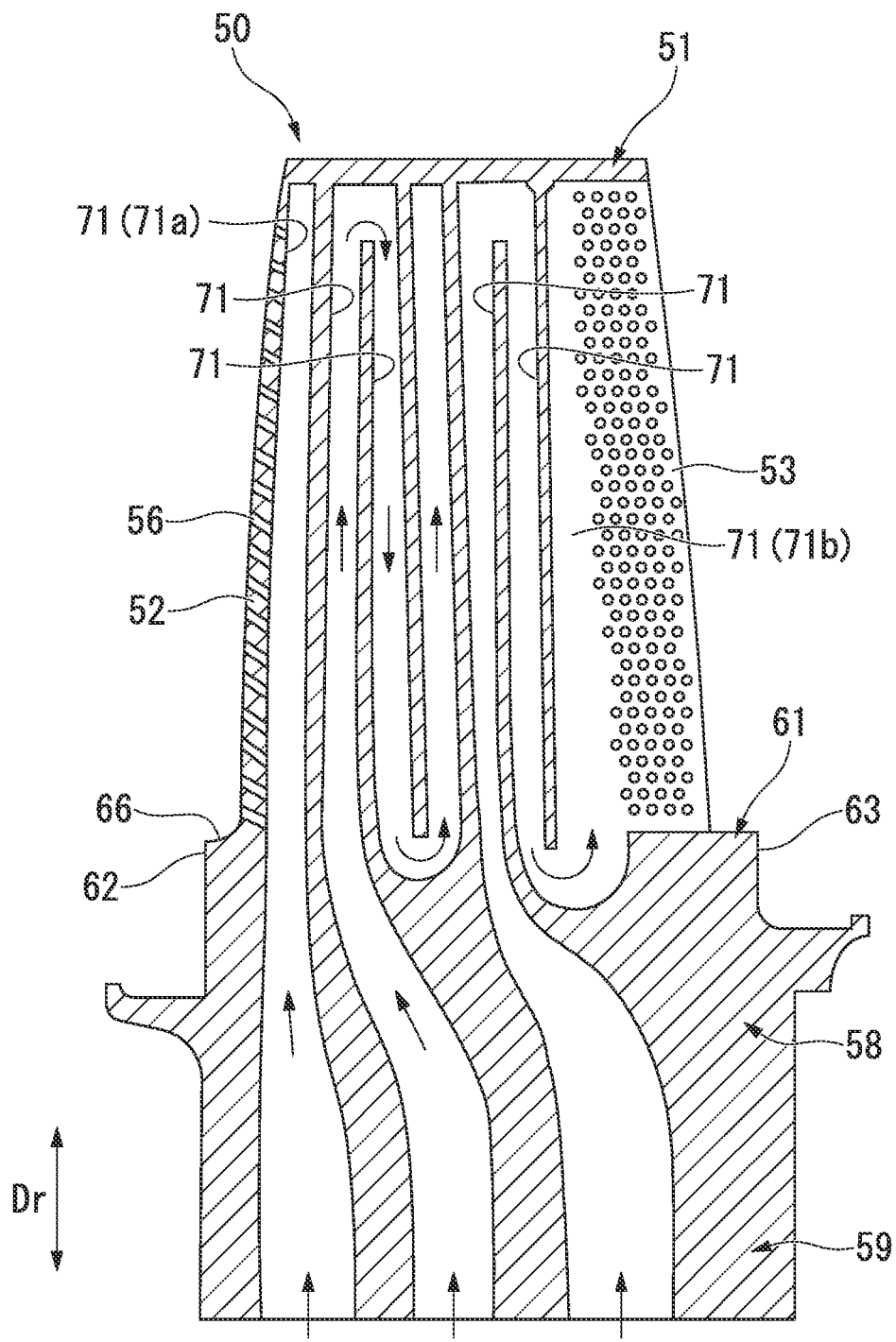
FIG. 5 shows a sectional view taken along line V-V in FIG. 4.

As shown in FIG. 5, the blade 50 is formed with a plurality of blade air passages 71 extending in the radial direction Dr. To be specific, the blade 50 of the present embodiment is formed with seven blade air passages 71. The number of the blade air passages 71 is seven as an illustrative example, but the present invention is not limited thereto. All of the blade air passages 71 are continuously formed at least from the blade body 51 to the platform 61 among the blade body 51, the platform 61, the shank 58, and the blade root 59. The plurality of blade air passages 71 are arranged along the chord of the blade body 51. The neighboring blade air passages 71 partly communicate with each other at portions of the radially outer side in the blade body 51 or at portions of the radially inner side of the platform 61. Also, at least one of the plurality of blade air passages 71 is continuously formed over the blade body 51, the platform 61, the shank 58, and the blade root 59, and is open at an end of the blade root 59 at the radially inner side. The cooling air from the cooling air passages 42p of the rotor shaft 42 flows into this opening of the blade air passage 71.

The blade body 51 is formed with blade front end passages 56 that extend from a first blade air passage 71a at the most upstream side among the plurality of blade air passages 71 to the upstream side and are open at the leading edge 52 of the blade body 51.

Figure 6:
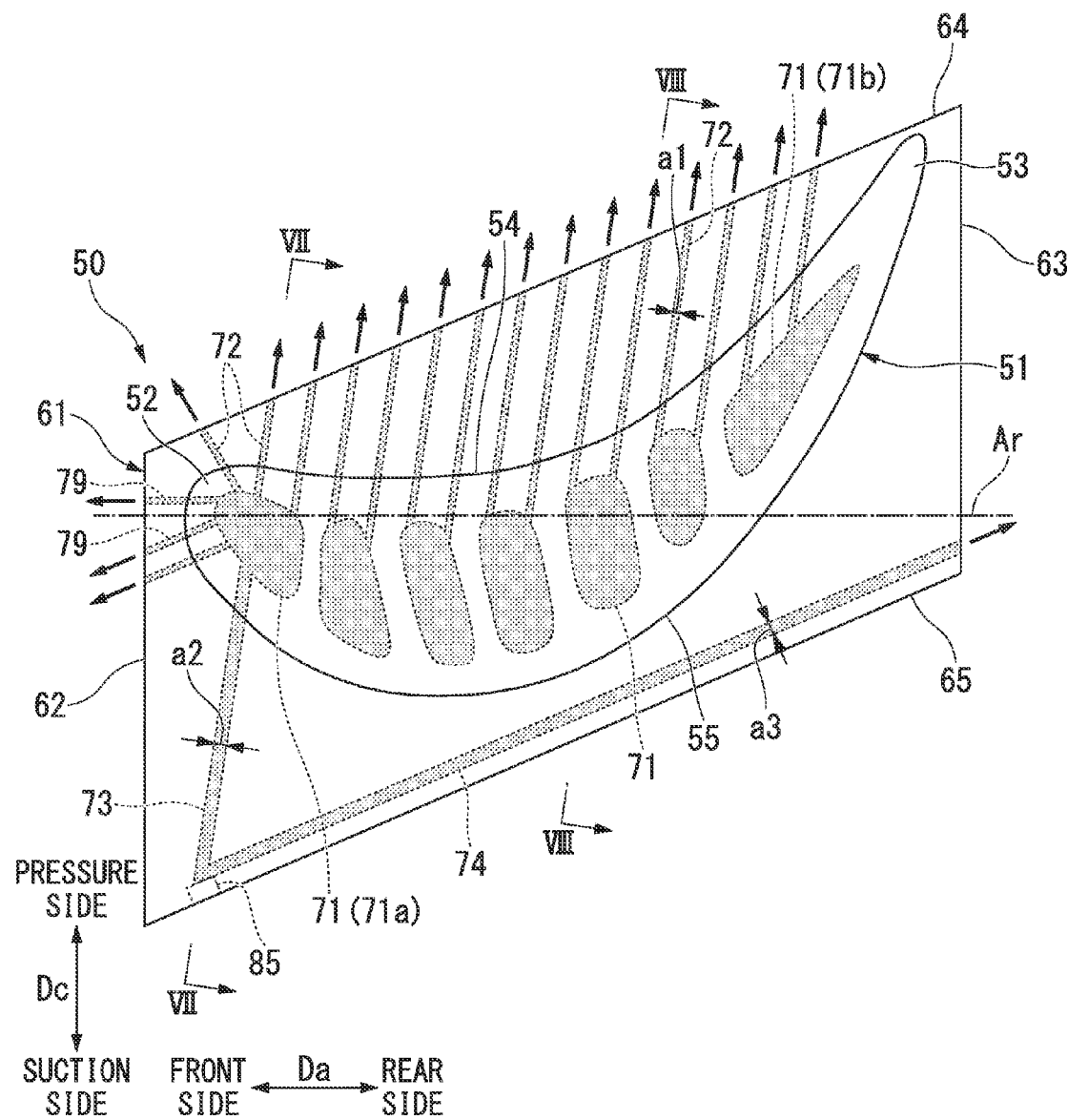
FIG. 6 shows a plane view of the blade in the embodiment according to the present invention.
Figure 7:
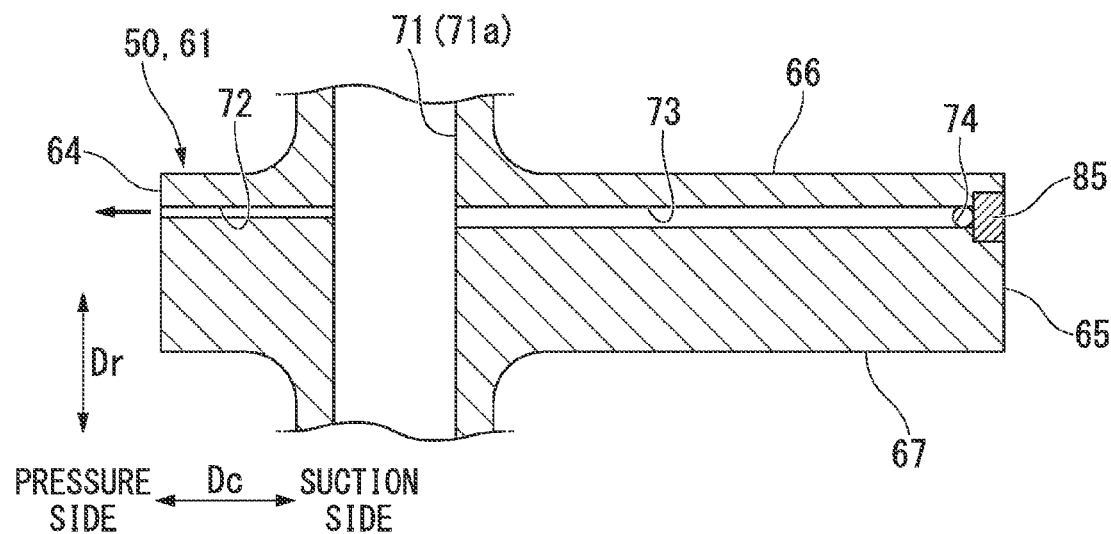
FIG. 7 shows a sectional view taken along line VII-VII in FIG. 6.
Figure 8:
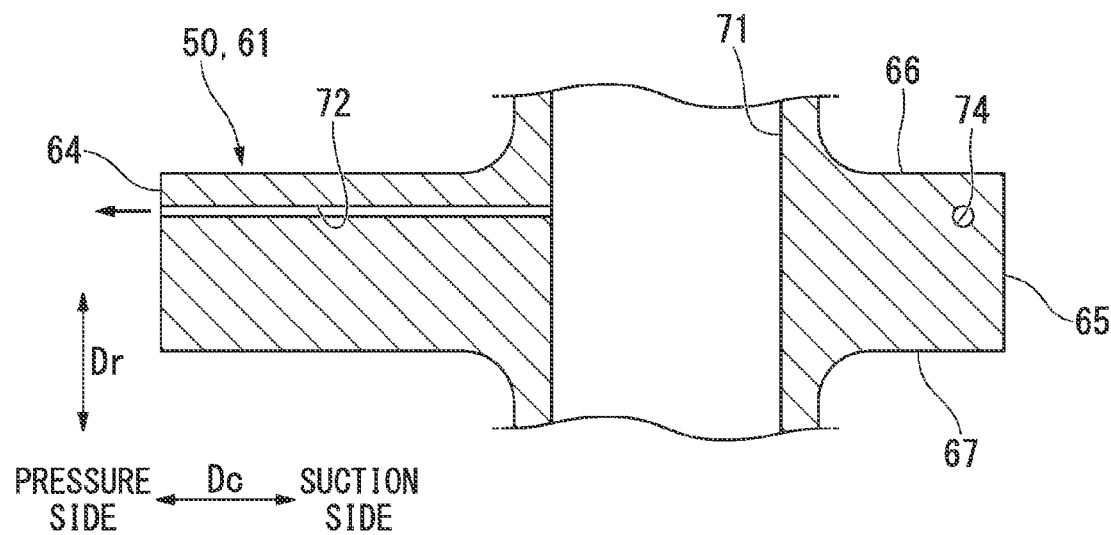
FIG. 8 shows a sectional view taken along line VIII-VIII in FIG. 6.

As shown in FIGS. 6 to 8, the platform 61 is formed with a plurality of pressure side passages 72 that extend from the respective plurality of blade air passages 71 toward the pressure side in the circumferential direction Dc, a plurality of front side passages 79 that extend from the first blade air passage 71a to the front side, a suction side main passage 73 that extends from the first blade air passage 71a toward the circumferential suction side, and a suction side passage 74 that extends along the suction side end face 65 from the suction side main passage 73 toward the downstream side in a direction having an axial component.

The plurality of pressure side passages 72 are arranged in the axial direction Da. Each of the pressure side passages 72 is open at the pressure side end face 64 of the platform 61. All of the plurality of front side passages 79 are open at the front end face 62 of the platform 61. The suction side main passage 73 has an opening at the suction side end face 65 of the platform 61. This opening is blocked by a lid 85, and the lid 85 and an edge of the opening are joined. This suction side main passage 73 is formed from the suction side end face 65 of an intermediate cast of the blade 50, in which the plurality of blade air passages 71 are formed, by machine work, electric discharge machining, etc. Afterwards, the opening of the suction side end face 65 in this suction side main passage 73 is closed with the lid 85, and the lid 85 and the edge of the opening are joined by, for instance, brazing. The suction side passage 74 is open at the rear end face 63 of the platform 61.

In the present embodiment, a cross-sectional area a2 of the suction side main passage 73 is substantially the same as a cross-sectional area a3 of the suction side passage 74. Also, each of cross-sectional areas a1 of the plurality of pressure side passages 72 is smaller than the cross-sectional area a2 of the suction side main passage 73 and the cross-sectional area a3 of the suction side passage 74. However, the sum of the cross-sectional areas a1 of the plurality of pressure side passages 72 is larger than the cross-sectional area a2 of the suction side main passage 73 and the cross-sectional area a3 of the suction side passage 74. All of the cross-sectional areas of the passages are cross-sectional areas at planes perpendicular to the longitudinal direction of the passages.

The cooling air passing through the cooling air passages 42p of the rotor shaft 42 flows into the blade air passages 71 that are open at the end of the blade root 59 at the radially inner side among the plurality of blade air passages 71 formed in the blade 50. According to circumstances, the cooling air flowing into these blade air passages 71 flows into a blade cooling flow channel adjacent to these blade air passages 71. In the process of passing through the plurality of blade air passages 71, the cooling air exchanges heat with the blade body 51, thereby cooling the blade body 51.

Portion of the cooling air flowing into the first blade air passage 71a at the most upstream side among the blade air passages 71 flows from the plurality of blade front end passages 56 of the blade body 51 to the combustion gas flow channel. This portion of the cooling air also flows from a seventh blade air passage 71b at the most downstream side among the blade air passages 71 to the combustion gas flow channel. Accordingly, the leading edge 52 and the trailing edge 53 of the blade body 51 are cooled by these portions of cooling air.

Portion of the cooling air flowing into the first blade air passage 71a flows from the openings of the front side passages 79 formed in the front end face 62 of the platform 61 through the front side passages 79 of the platform 61 communicating with the first blade air passage 71a to the outside of the platform 61. Accordingly, a portion that is located on the gas path surface 66 of the platform 61 at the radially outer side of the front side passages 79 is cooled by the cooling air passing through the front side passages 79. Further, a portion that is located on the front end face 62 of the platform 61 around the openings of the front side passages 79 is cooled by the cooling air flowing out of these openings.

Another portion of the cooling air flowing into the first blade air passage 71a flows from the openings of the pressure side passages 72 formed in the pressure side end face 64 of the platform 61 through the pressure side passages 72 of the platform 61 to the outside of the platform 61. Similarly, portion of the cooling air flowing into another blade air passage 71 also flows from the openings of the pressure side passages 72 formed in the pressure side end face 64 of the platform 61 through the pressure side passages 72 of the platform 61 which communicate with this blade air passage 71 to the outside of the platform 61. Accordingly, a portion that is located on the gas path surface 66 of the platform 61 at the radially outer side of the pressure side passages 72 is cooled by the cooling air passing through these pressure side passages 72. Further, a portion that is located on the pressure side end face 64 of the platform 61 around the openings of the pressure side passages 72 is cooled by the cooling air flowing out of these openings.

Yet another portion of the cooling air flowing into the first blade air passage 71a flows from the opening of the suction side passage 74 formed in the rear end face 63 of the platform 61 through the suction side main passage 73 and the suction side passage 74 of the platform 61 to the outside of the platform 61. Accordingly, portions that are located on the gas path surface 66 of the platform 61 at the radially outer side of the suction side main passage 73 and at the radially outer side of the suction side passage 74 are cooled by the cooling air passing through these suction side main passage 73 and suction side passage 74. Further, a portion that is located on the rear end face 63 of the platform 61 around the opening of the suction side passage 74 is cooled by the cooling air flowing out of this opening.

Incidentally, when heated by the combustion gas, the platform 61 tries to thermally expand in various directions. Since a portion located within the platform 61 at the circumferential pressure side with respect to the blade body 51 is surrounded by the pressure side 54 of the blade body 51 recessed toward the circumferential suction side, heat expansion of the portion at this circumferential pressure side is restrained to some extent by the blade body 51. On the other hand, since a portion located within the platform 61 at the circumferential suction side with respect to the blade body 51 is not surrounded by the blade body 51, heat expansion of the portion at this circumferential suction side is not particularly restrained by the blade body 51.

For this reason, thermal stress generated on the portion located within the platform 61 at the circumferential pressure side with respect to the blade body 51 is higher than that generated on the portion at the circumferential suction side.

Thus, in the present embodiment, the portion located within the platform 61 at the circumferential pressure side is formed with the plurality of pressure side passages 72, and the flow rate of the cooling air cooling this portion is increased to suppress the thermal stress of this portion. On the other hand, the portion located within the platform 61 at the circumferential suction side is formed with one suction side main passage 73 and one suction side passage 74 communicating with this, and only the vicinity of the suction side end face 65 of the platform 61, which easily increases in temperature, is cooled to thereby reduce the flow rate of the cooling air.

Also, in the present embodiment, as described above, each of the cross-sectional areas a1 of the plurality of pressure side passages 72 is made smaller than the cross-sectional area a2 of the suction side main passage 73 and the cross-sectional area a3 of the suction side passage 74 while increasing the flow rate of the cooling air cooling the portion located within the platform 61 at the circumferential pressure side. Thereby, the flow velocity of the air flowing through the plurality of pressure side passages 72 increases, and cooling efficiency of the portion at the circumferential pressure side is improved.

Accordingly, in the present embodiment, it is possible to suppress the usage of the cooling air while improving the durability of the blades 50.

(First Modified Example of Blade)

Figure 9:
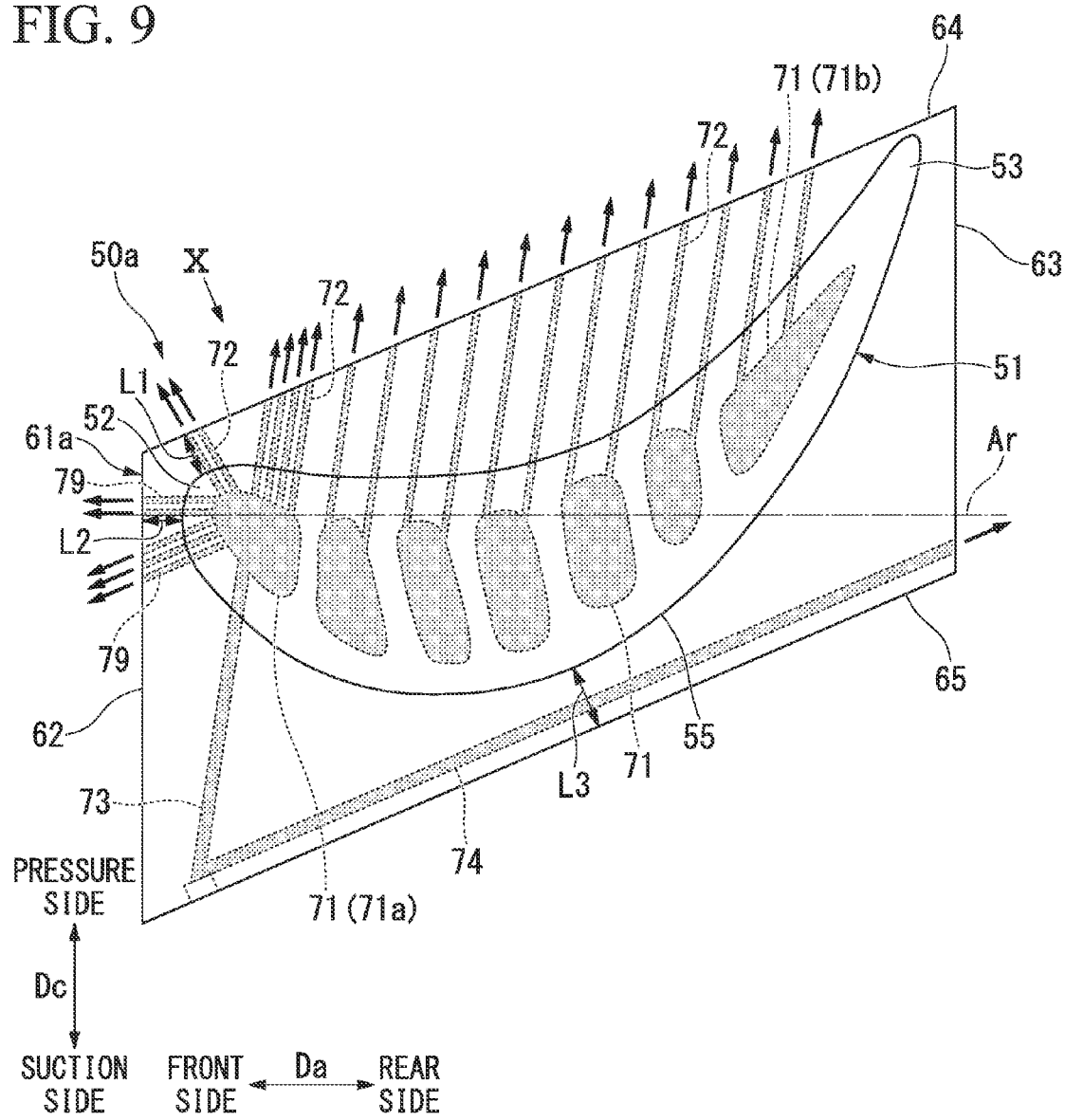
FIG. 9 shows a plane view of a blade in a first modified example of the embodiment according to the present invention.

A first modified example of the blade according to the present invention will be described using FIGS. 9 and 10.

In a blade 50a of the present modified example, the numbers of the pressure side passages 72 and the front side passages 79, both of which communicate with the first blade air passage 71a of the blade 50 of the above embodiment, are increased, while the other constitutions are the same as those of the blade 50 of the above embodiment.

Like the above embodiment, a platform 61a of the present modified example is also formed with the plurality of pressure side passages 72 that extend from the first blade air passage 71a toward the circumferential pressure side and are open at the pressure side end face 64 of the platform 61a. The plurality of pressure side passages 72 are arranged in the axial direction Da. As described above, the number of the pressure side passages 72 extending from the first blade air passage 71a toward the circumferential pressure side is more than the number of the pressure side passages 72 extending from the first blade air passage 71a toward the circumferential pressure side in the above embodiment.

Similarly to the above embodiment, the platform 61a of the present modified example is also formed with the plurality of front side passages 79 that extend from the first blade air passage 71a to the front side and are open at the front end face 62 of the platform 61a. The plurality of front side passages 79 are arranged in the circumferential direction Dc. As described above, the number of the front side passages 79 extending from the first blade air passage 71a to the front side is more than the number of the front side passages 79 extending from the first blade air passage 71a toward the front side in the above embodiment.

For this reason, in the present modified example, an interval between openings of the pressure side passages 72 adjacent to each other at a front side portion of the pressure side end face 64 of the platform 61a is narrower than an interval between openings of the pressure side passages 72 adjacent to each other at an intermediate portion of this pressure side end face 64 in the axial direction Da. Also, in the present modified example, an interval between openings of the front side passages 79 adjacent to each other at the front end face 62 of the platform 61a is narrower than an interval between the openings of the pressure side passages 72 adjacent to each other at the intermediate portion of this pressure side end face 64 of the platform 61a in the axial direction Da.

A case in which the shortest distance L1 between the leading edge 52 of the blade body 51 and the pressure side end face 64 of the platform 61a is shorter than the shortest distance L3 between the suction side 55 of the blade body 51 and the suction side end face 65 of the platform 61a will be reviewed.

Since a boundary layer is thin on a region of the platform 61a which is adjacent to the leading edge 52 of the blade body 51, the heat-transfer coefficient is high. For this reason, a front side portion located within the platform 61a at the circumferential pressure side with respect to the blade body 51 reaches a high temperature due to the high heat-transfer coefficient, and tries to thermally expand significantly. On the other hand, since an interval between the leading edge 52 of the blade body 51 and the pressure side end face 64 of the platform 61a is narrower than an interval between an intermediate portion of the blade body 51 and the pressure side end face 64 of the platform 61a, thermal expansion of the front side portion of the platform 61a at the circumferential pressure side is strongly restrained by the blade body 51. For this reason, the portion at the front side that is the circumferential pressure side is subjected to a higher thermal stress accompanying start and stop of the gas turbine and decreases in operating life due to a low cycle fatigue.

Thus, in the present modified example, to cope with this case, the number of the pressure side passages 72 at the front side is increased above the number of the pressure side passages 72 at the front side in the above embodiment, thereby cooling this portion more than in the above embodiment and suppressing thermal stress of this portion.

Next, a case in which the shortest distance L2 between the leading edge 52 of the blade body 51 and the front end face 62 of the platform 61*a* is shorter than the shortest distance L3 between the suction side 55 of the blade body 51 and the suction side end face 65 of the platform 61*a* will also be reviewed.

In this case, too, since the portion located within the platform 61*a* at the circumferential pressure side that is the front side with respect to the blade body 51 is close to the leading edge 52 of the blade body 51 which reaches a high temperature, the temperature of the portion easily increases, and operating life is reduced due to high-temperature oxidation thinning caused by this.

Thus, in the present modified example, to cope also with this case, the number of the front side passages 79 at the pressure side is increased above the number of the front side passages 79 at the pressure side in the above embodiment, thereby cooling this portion more than in the above embodiment and suppressing high-temperature oxidation thinning of this portion.

As described above, when the number of the pressure side passages 72 at the front side is increased, the interval in the axial direction Da between the pressure side passages 72 adjacent to each other in the axial direction Da is narrowed. If the interval between the pressure side passages 72 adjacent to each other is narrowed, the strength around the plurality of pressure side passages 72 may become lower than a target strength.

Figure 10:
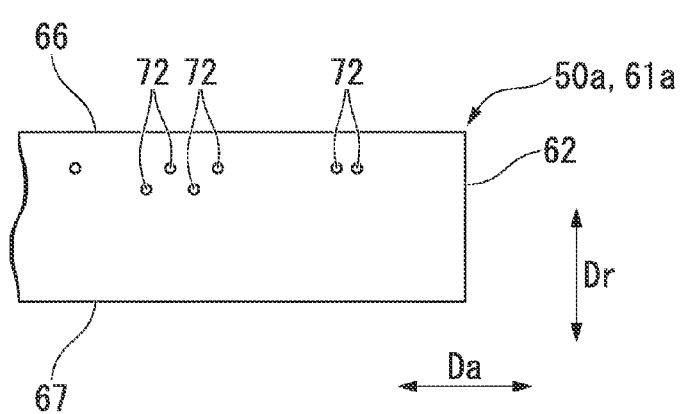
FIG. 10 shows a view in the direction of an arrow X in FIG. 9.

Thus, in this case, as shown in FIG. 10, positions of the openings of the pressure side passages 72 adjacent to each other in the axial direction Da among the plurality of pressure side passages 72 at the front side may be made different from each other in the radial direction Dr. In this way, if the positions of the openings of the two pressure side passages 72 adjacent to each other in the axial direction Da are made different from each other in the radial direction Dr, the actual interval between the two pressure side passages 72 can be made wider than the interval between the two pressure side passages 72 in the axial direction Da. Accordingly, when the number of the pressure side passages 72 at the front side is increased, the positions of the openings of the pressure side passages 72 adjacent to each other in the axial direction Da are made different from each other in the radial direction Dr. Thereby, it is possible to suppress a decrease in strength around the plurality of pressure side passages 72.

Here, the method of preventing the strength around the plurality of the pressure side passages 72 from being reduced when the number of the pressure side passages 72 is increased has been described. However, similarly, when the number of the front side passages 79 is increased, positions of the openings of the front side passages 79 adjacent to each other in the circumferential direction Dc among the plurality of front side passages 79 may also be made different from each other in the radial direction Dr.

(Second Modified Example of Blade)

Figure 11:
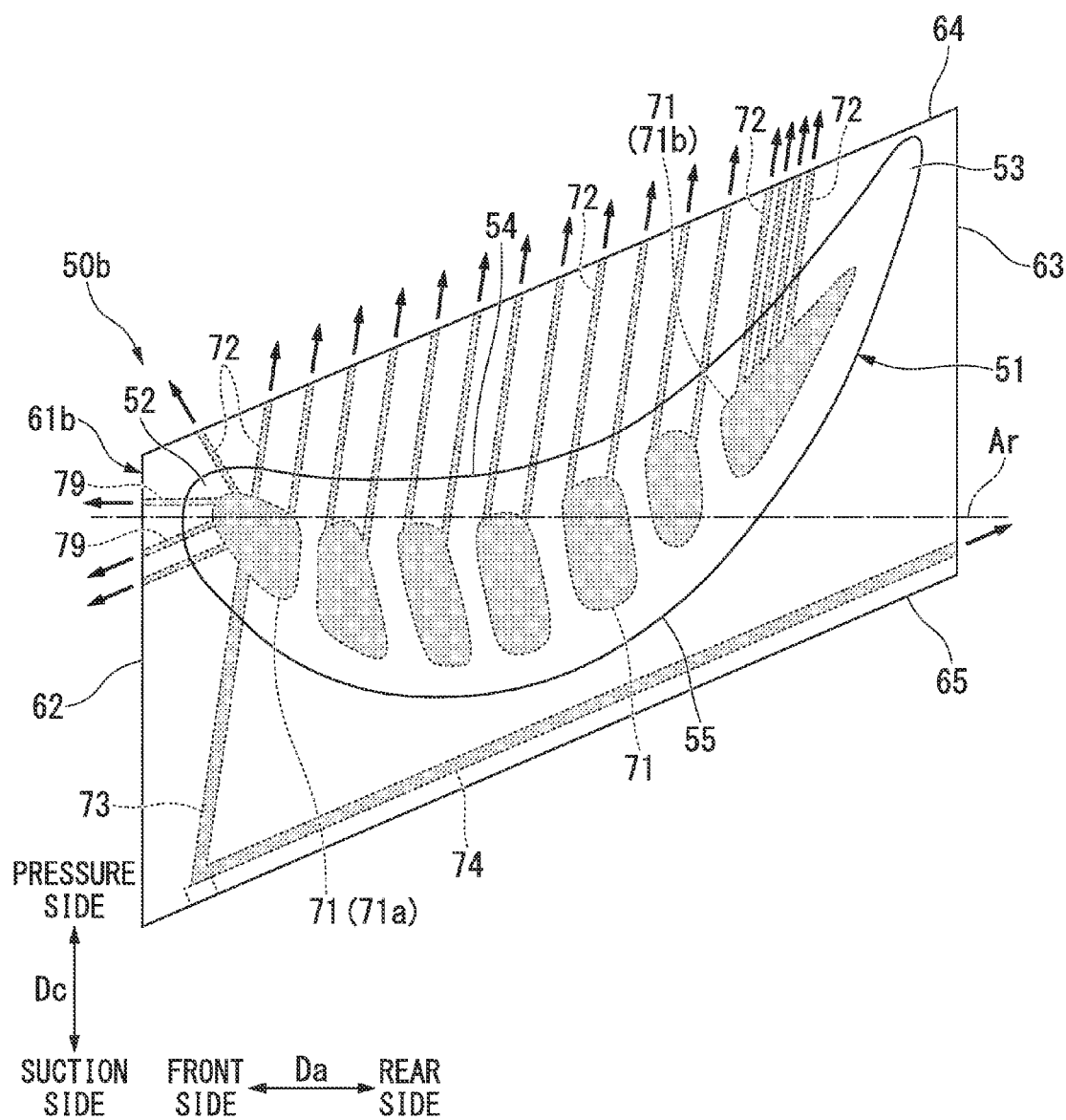
FIG. 11 shows a plane view of a blade in a second modified example of the embodiment according to the present invention.

A second modified example of the blade according to the present invention will be described using FIG. 11.

In a blade 50*b* of the present modified example, the number of the pressure side passages 72 communicating with the seventh blade air passage 71*b* of the blade 50 of the above embodiment is increased, while the other constitutions are the same as those of the blade 50 of the above embodiment.

Like the above embodiment, a platform 61*b* of the present modified example is also formed with the plurality of pressure side passages 72 that extend from the seventh blade air passage 71*b* toward the pressure side in the circumferential direction Dc and are open at the pressure side end face 64 of the platform 61*b*. The plurality of pressure side passages 72 are arranged in the axial direction Da.

For this reason, in the present modified example, an interval between openings of the pressure side passages 72 adjacent to each other at a portion of the pressure side end face 64 of the platform 61*b* at the axially downstream side is narrower than that between openings of the pressure side passages 72 adjacent to each other at an intermediate portion of this pressure side end face 64 in the axial direction Da.

The flow of the combustion gas is accelerated by the blade body 51 in the vicinity of the trailing edge 53 of the blade body 51 within the platform 61*b*. For this reason, the heat-transfer coefficient is higher in the vicinity of the trailing edge 53 of the blade body 51 within the platform 61*b* than in the vicinity of the intermediate portion of the blade body 51 within the platform 61*b*. Also, an interval between the trailing edge 53 of the blade body 51 and the pressure side end face 64 of the platform 61*b* is narrower than that between the intermediate portion of the blade body 51 and the pressure side end face 64 of the platform 61*b*. For this reason, a portion of the platform 61*b* which is located at the rear side that is the circumferential pressure side has thermal expansion strongly restrained by the trailing edge 53 of the blade body 51. Accordingly, the portion of the platform 61*b* which is located at the rear side that is the circumferential pressure side is subjected to a higher thermal stress accompanying start and stop of the gas turbine and decreases in operating life due to a low cycle fatigue.

Thus, in the present modified example, to cope with this case, the number of the pressure side passages 72 at the rear side is increased above the number of the pressure side passages 72 at the rear side in the above embodiment, thereby cooling this portion more than in the above embodiment and suppressing thermal stress of this portion.

As described above, when the number of the pressure side passages 72 at the rear side is increased, the positions of the openings of the pressure side passages 72 adjacent to each other in the axial direction Da among the plurality of pressure side passages 72 may also be made different from each other in the radial direction Dr like the case described using FIG. 10.

(Third Modified Example of Blade)

Figure 12:
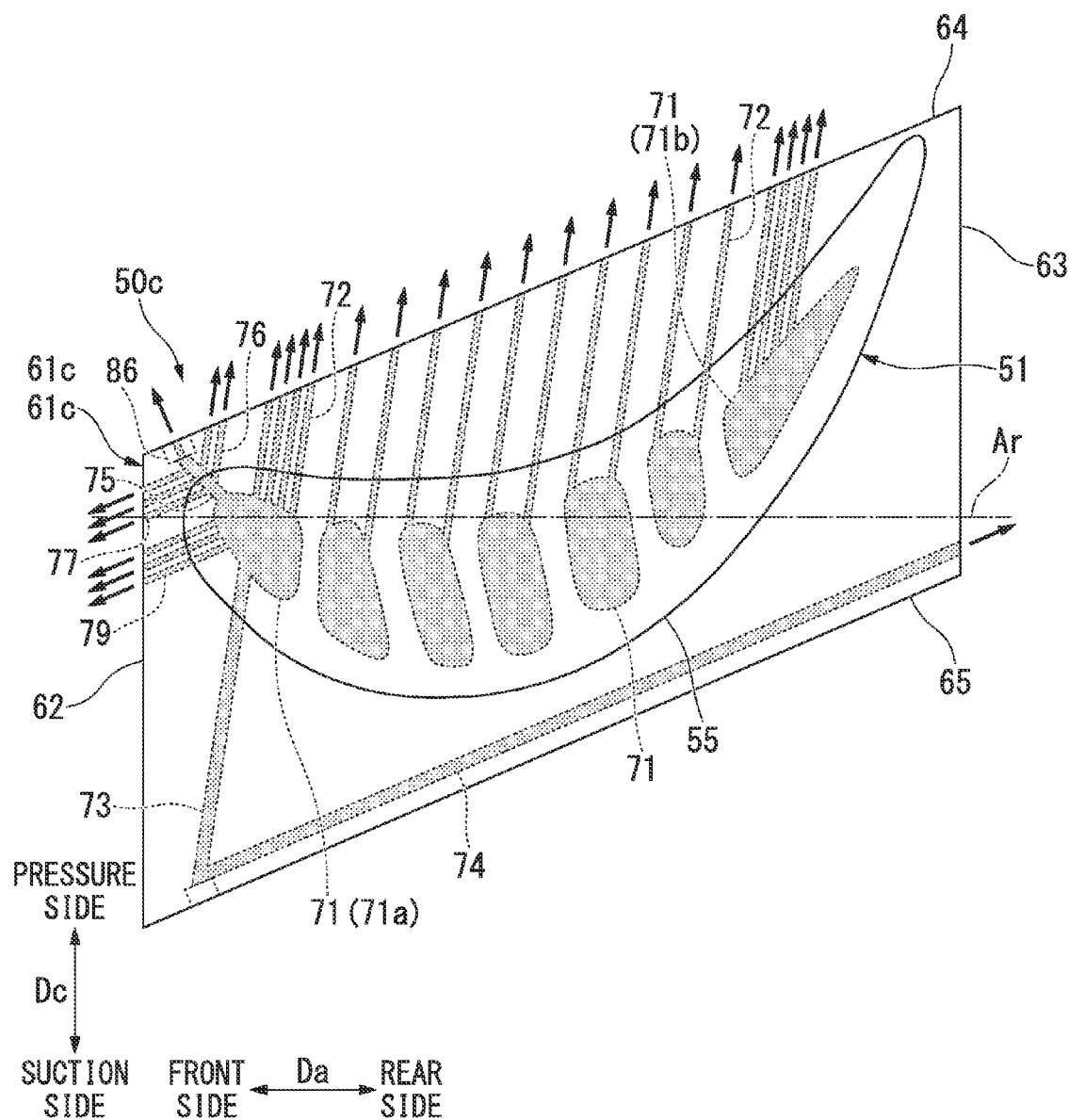
FIG. 12 shows a plane view of a blade in a third modified example of the embodiment according to the present invention.

A third modified example of the blade according to the present invention will be described using FIGS. 12 and 13.

A blade 50*c* of the present modified example is modified from the blade 50*a* of the first modified example. In the blade 50*a* of the first modified example, all of the passages that are open at the front side portion of the pressure side end face 64 of the platform 61*a* are the pressure side passages 72 that extend from the first blade air passage 71*a* to the radial pressure side. Also, in the blade 50*a* of the first modified example, all of the passages that are open at the front end face 62 of the platform 61*a* are the front side passages 79 that extend from the first blade air passage 71*a* to the upstream side in the radial direction Dr.

A platform 61*c* of the present modified example is formed with a front side main passage 75 that extends from the first blade air passage 71*a* toward the front side while being directed to the circumferential pressure side, a plurality of pressure front side passages 76 that extend from the front side main passage 75 toward the circumferential pressure side and are open at the pressure side end face 64 of the platform 61c, and a plurality of front pressure side passages 77 that extend from the front side main passage 75 toward the front side and are open at the front end face 62 of the platform 61c. Further, similarly to the above embodiment and the first and second modified examples, the platform 61c of the present modified example is formed with the plurality of pressure side passages 72 that extend from the first blade air passage 71a toward the circumferential pressure side, and the plurality of front side passages 79 that extend from the first blade air passage 71a to the upstream side in the axial direction Da. That is, in the present modified example, the passages opening at the pressure side end face 64 of the platform 61c include the plurality of pressure side passages 72 and the plurality of pressure front side passages 76. Also, in the present modified example, the passages opening at the front end face 62 of the platform 61c include the plurality of front side passages 79 and the plurality of front pressure side passages 77.

In the present modified example, too, an interval between openings of the pressure side passages 72 adjacent to each other at a front side portion of the pressure side end face 64 of the platform 61c is narrower than that between openings of the pressure side passages 72 adjacent to each other at an intermediate portion of this pressure side end face 64 in the axial direction Da. Also, in the present modified example, an interval between openings of the front side passages 79 adjacent to each other at the front end face 62 of the platform 61c is narrower than that between the openings of the pressure side passages 72 adjacent to each other at the intermediate portion of this pressure side end face 64 of the platform 61c in the axial direction Da. Further, in the present modified example, an interval between openings of the pressure front side passages 76 adjacent to each other at the front side portion of the pressure side end face 64 of the platform 61c is narrower than that between the openings of the pressure side passages 72 adjacent to each other at the intermediate portion of this pressure side end face 64 in the axial direction Da. Also, in the present modified example, an interval between openings of the front pressure side passages 77 adjacent to each other at the front end face 62 of the platform 61c is narrower than that between the openings of the pressure side passages 72 adjacent to each other at the intermediate portion of the pressure side end face 64 of the platform 61c in the axial direction Da. Also, in the present modified example, a cross-sectional area of the front side main passage 75 is greater than the sum of the cross-sectional areas of the plurality of pressure front side passages 76 and the front pressure side passages 77.

Like the blade 50a of the first modified example, if the number of the pressure side passages 72 extending from the first blade air passage 71a and the number of the front side passages 79 extending from the first blade air passage 71a are increased, intervals between positions at which these passages are connected to the first blade air passage 71a are narrowed. In particular, at a portion at which a radius of curvature is reduced on an outer circumferential surface of the first blade air passage 71a, and particularly at a portion of the front side on the outer circumferential surface of the first blade air passage 71a, the intervals between the positions at which the plurality of passages, which are connected to this portion, are connected to the first blade air passage 71a are further narrowed. In this case, depending on machining accuracy of these passages, the positions at which these passages are connected to the first blade air passage 71a are considered to overlap each other.

If the intervals between the positions at which these passages are connected to the first blade air passage 71a are narrowed, the strength around portions of these passages at the side of the first blade air passage 71a may become lower than a target strength. Further, cooling air may not flow at a flow rate required for each of the front side passages 79.

Thus, in the present modified example, to increase the area of a region, on which these passages are connectable, to widen the intervals of these passages at a cooling air supply side of the first blade air passage 71a, the front side main passage 75 communicating with the first blade air passage 71a is provided, and the plurality of pressure front side passages 76 and the plurality of front pressure side passages 77 are provided for the front side main passage 75.

In the present modified example, similarly to the first modified example, the number of the passages that are open at the front side of the pressure side end face 64 of the platform 61c and the number of the passages that are open at the pressure side of the front end face 62 of the platform 61c are increased above the number of the passages that are open at the intermediate portion of the pressure side end face 64 of the platform 61c in the axial direction Da. Further, as the cross-sectional area of the front side main passage 75 is made greater than the sum of the cross-sectional areas of the plurality of pressure front side passages 76 and the front pressure side passages 77, it is possible to guide the cooling air to the pressure front side passages 76 and the front pressure side passages 77 with low pressure loss. Thereby, the flow velocity of the cooling air at the pressure front side passages 76 and the front pressure side passages 77 can be increased, and cooling efficiency can be increased. Accordingly, in the present modified example, it is possible to suppress the thermal stress of the portion of the platform 61c at the front and pressure side.

Also, in the present modified example, both the pressure front side passages 76 that are open at the pressure side end face 64 of the platform 61c and the front pressure side passages 77 that are open at the front end face 62 of the platform 61c communicate with the first blade air passage 71a via the front side main passage 75. Accordingly, in the present modified example, the intervals at the cooling air supply side of the passages that are open at the pressure side end face 64 and the front end face 62 of the platform 61c are widened, and the strength of the portions of these passages at the cooling air supply side can be inhibited from being reduced.

The front side main passage 75, which extends from the first blade air passage 71a toward the upstream side in the axial direction Da while being directed to the pressure side in the circumferential direction Dc, has an opening at the pressure side end face 64 of the platform 61c. This opening is blocked by a lid 86, and the lid 86 and an edge of the opening are joined by, for instance, brazing. For example, as shown in FIG. 13, the lid 86 may be formed with a through-hole 86a that passes from the inside of the front side main passage 75 to the outside of the platform 61c. In this way, if the through-hole 86a is formed in the lid 86, the front side portion of the pressure side end face 64 of the platform 61c is further cooled, and the thermal stress of the portion of the platform 61c at the pressure and front side can be suppressed. Further, the joined portion at which the edge of the opening of the front side main passage 75 and the lid 86 are joined by brazing is cooled, and the joining reliability of this joined portion can be increased. In this example, the lid 86 blocking the opening of the front side main passage 75 is formed with the through-hole. However, in the above embodiment and each of the modified examples, a through-hole may be similarly formed in the lid blocking the opening of the main passage.

(Fourth Modified Example of Blade)

Figure 14:
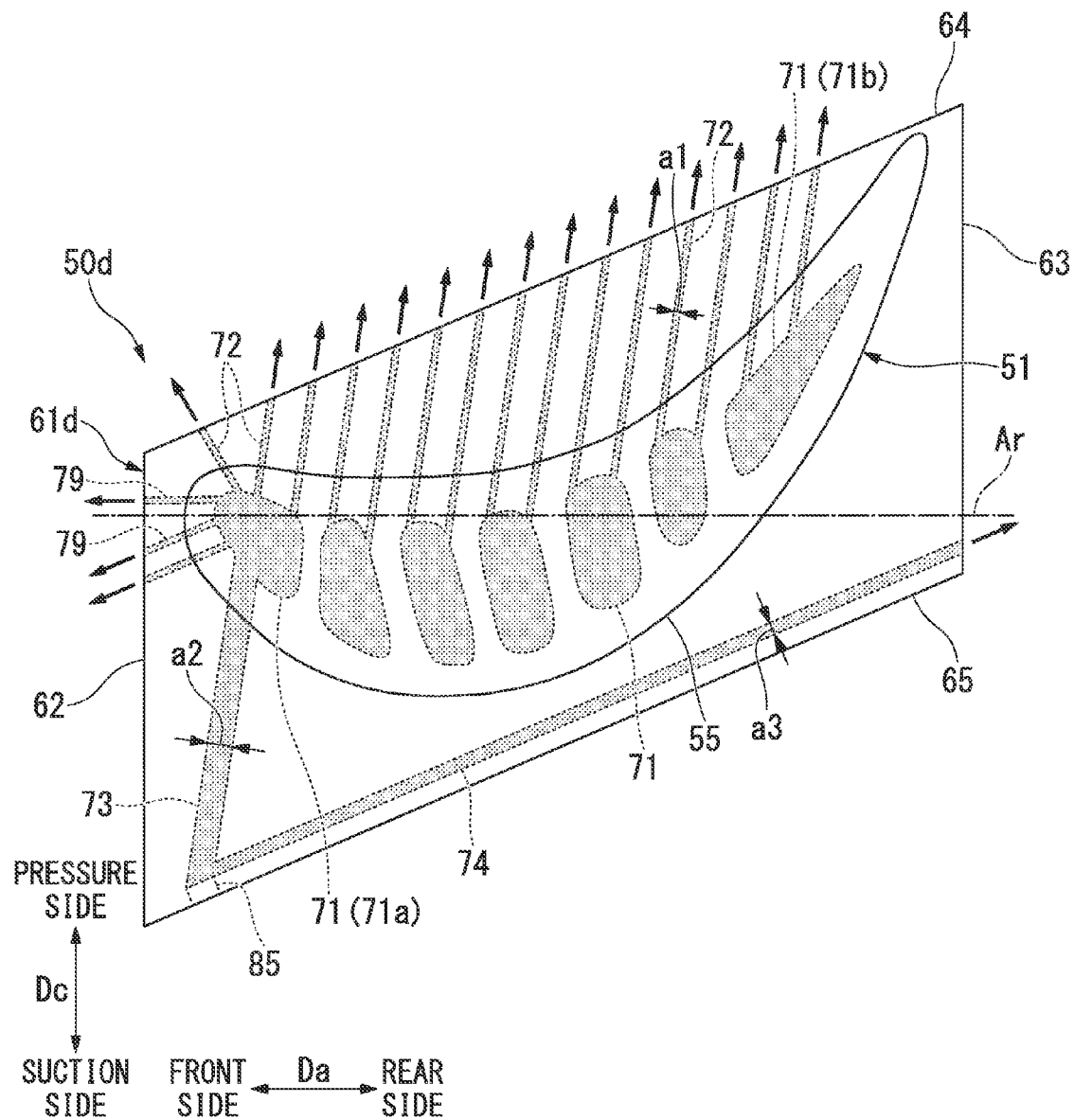
FIG. 14 shows a plane view of a blade in a fourth modified example of the embodiment according to the present invention.

A fourth modified example of the blade according to the present invention will be described using FIG. 14.

In a blade 50d of the present modified example, the cross-sectional area a2 of the suction side main passage 73 is greater than the cross-sectional area a3 of the suction side passage 74 in the blade 50 of the above embodiment, while the other constitutions are the same as those of the blade 50 of the above embodiment.

Similarly to the above embodiment and each of the modified examples, the cross-sectional area a3 of the suction side passage 74 of the present modified example is greater than the cross-sectional area a1 of each pressure side passage 72. Also, the cross-sectional area a2 of the suction side main passage 73 of the present modified example is greater than the cross-sectional area a3 of the suction side passage 74. Further, the sum of the cross-sectional areas of the plurality of pressure side passages 72 is greater than the cross-sectional area of the suction side passage 74.

As described above, since the cross-sectional area a2 of the suction side main passage 73 is greater than the cross-sectional area a3 of the suction side passage 74 in the present modified example, it is possible to reduce pressure loss of cooling air that flows from the first blade air passage 71a into the suction side passage 74 via the suction side main passage 73. Further, in the present modified example, since the flow velocity of the cooling air passing through the suction side passage 74 is increased, the heat-transfer coefficient can be increased at this suction side passage 74. Therefore, according to the present modified example, it is possible to efficiently cool a suction side portion of a platform 61d.

The present modified example is a modification of the above embodiment. However, it goes without saying that the present modified example can be applied to anything in which the suction side main passage 73 and the suction side passage 74 are formed.

(Fifth Modified Example of Blade)

Figure 15:
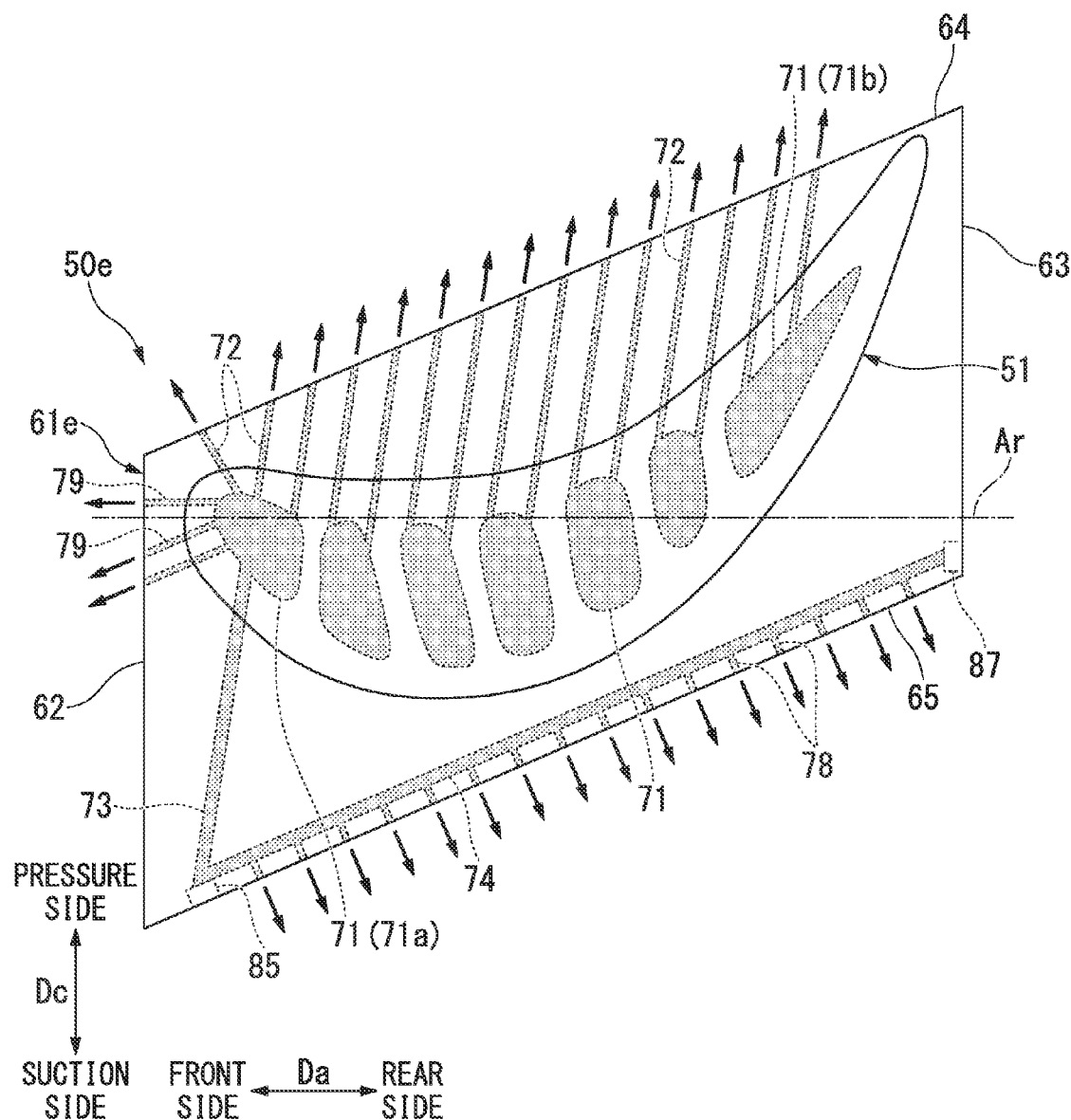
FIG. 15 shows a plane view of a blade in a fifth modified example of the embodiment according to the present invention.

A fifth modified example of the blade according to the present invention will be described using FIG. 15.

The suction side passage 74 of the above embodiment is open at the rear end face 63 of the platform 61. In a blade 50e of the present modified example, the opening of this suction side passage 74 is blocked with a lid 87, and a plurality of suction side branch passages 78 that extend from this suction side passage 74 toward the suction side end face 65 and are open at the suction side end face 65 of the platform 61e are formed, while the other constitutions are the same as those of the blade 50 of the above embodiment.

Each of cross-sectional areas of the plurality of suction side branch passages 78 is smaller than a cross-sectional area of the suction side passage 74. The sum of the cross-sectional areas of the plurality of suction side branch passages 78 is equal to or greater than the cross-sectional area of the suction side passage 74.

As described above, in the present modified example, since the plurality of suction side branch passages 78 that are open at the suction side end face 65 are provided, it is possible to cool the suction side end face 65 and to cool the pressure side end face 64 of another platform 61e adjacent to the platform 61e in the circumferential direction Dc.

Figure 13:
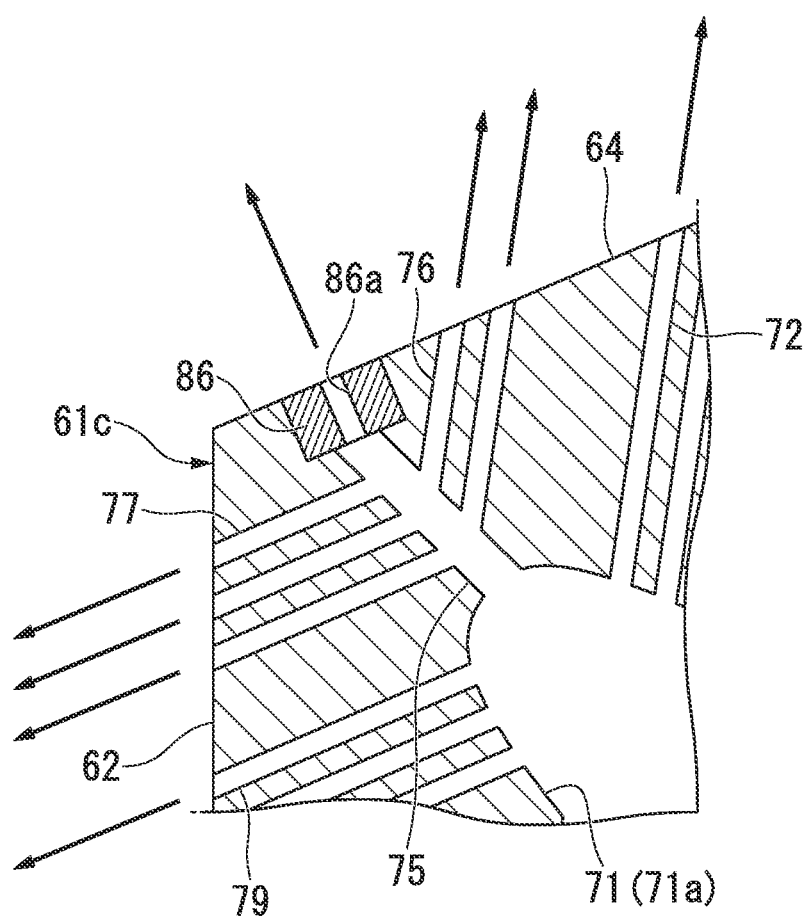
FIG. 13 shows a sectional view of major parts of the blade in the third modified example of the embodiment according to the present invention.

In the present modified example, the lid 85 blocking the opening of the suction side main passage 73 and the lid 87 blocking the opening of the suction side passage 74 formed as a main passage of the suction side branch passages 78 may be formed with a through-hole as described using FIG. 13.

(Sixth Modified Example of Blade)

Figure 16:
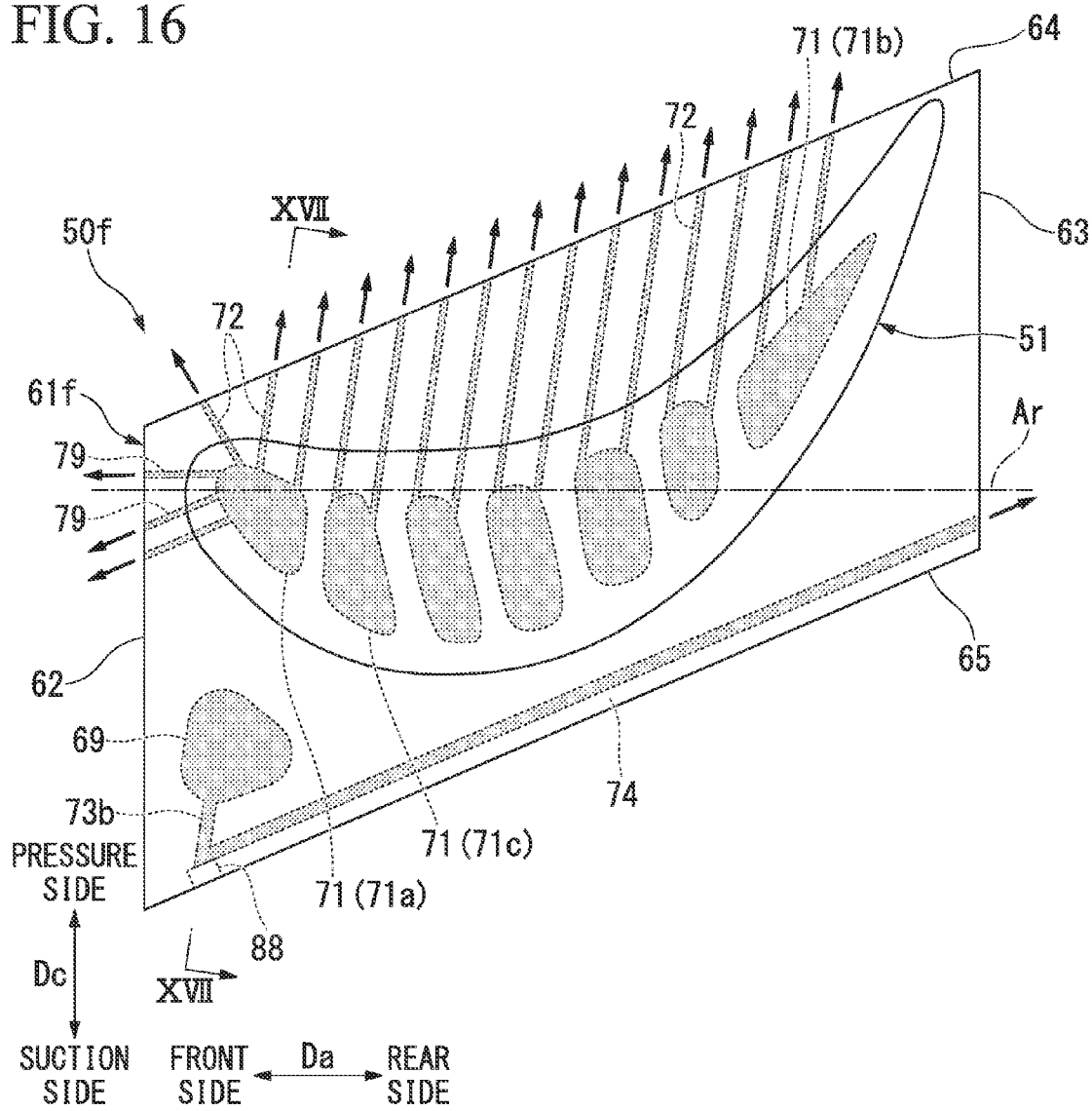
FIG. 16 shows a plane view of a blade in a sixth modified example of the embodiment according to the present invention.
Figure 17:
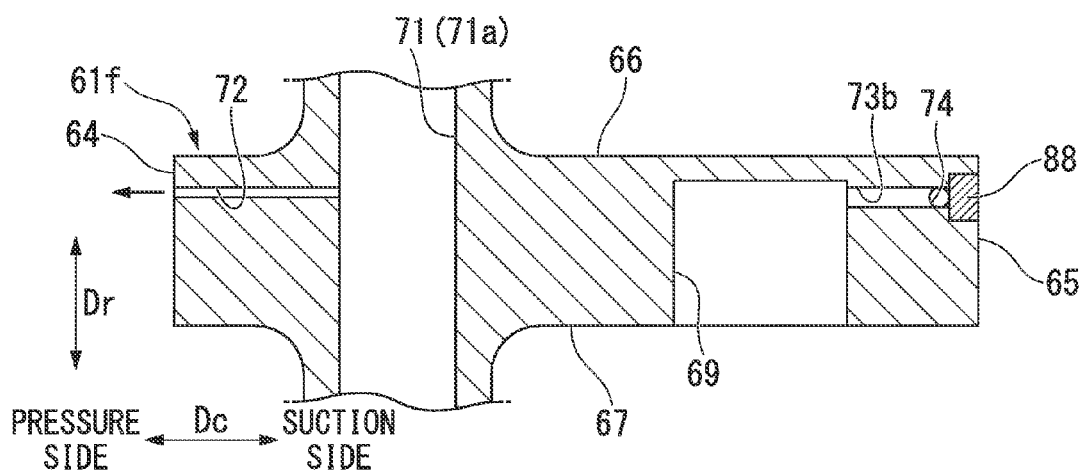
FIG. 17 shows a sectional view taken along line XVII-XVII in FIG. 16.

A sixth modified example of the blade according to the present invention will be described using FIGS. 16 and 17.

In the blade 50 of the above embodiment, the suction side main passage 73 receives the cooling air from the first blade air passage 71a. However, a blade 50f of the present modified example has a constitution in which a suction side main passage 73b receives cooling air from another place, while the other constitutions are the same as those of the blade 50 of the above embodiment.

A platform 61f of the present modified example is formed with a recess 69 which is recessed from the inner surface 67 of the platform 61f toward the radially outer side at a position that is at the front side and is at the suction side from the blade body 51 and into which the cooling air flows. The suction side main passage 73b of the present modified example communicates with this recess 69 and receives the cooling air from the recess 69. The suction side main passage 73b has an opening at the suction side end face 65 of the platform 61f. This opening is blocked by a lid 88, and the lid 88 and an edge of the opening are joined by, for instance, brazing.

As described above, in the present modified example, the place from which the suction side main passage 73b receives cooling air is changed from that of the above embodiment, while the other constitutions are the same as those of the above embodiment. Thus, similarly to the above embodiment, it is possible to suppress the usage of the cooling air while improving the durability of the blade 50f.

Also, in the present modified example, since the suction side main passage 73b does not receive the cooling air from the first blade air passage 71a, the cooling air flowing through the first blade air passage 71a can be used for other purposes.

In the present modified example, the recess 69 and the suction side main passage 73b communicate with each other. However, a second blade air passage 71c that is the second one from the axially upstream side among the plurality of blade air passages 71 and the suction side main passage 73b may communicate with each other.

(Seventh Modified Example of Blade)

Figure 18:
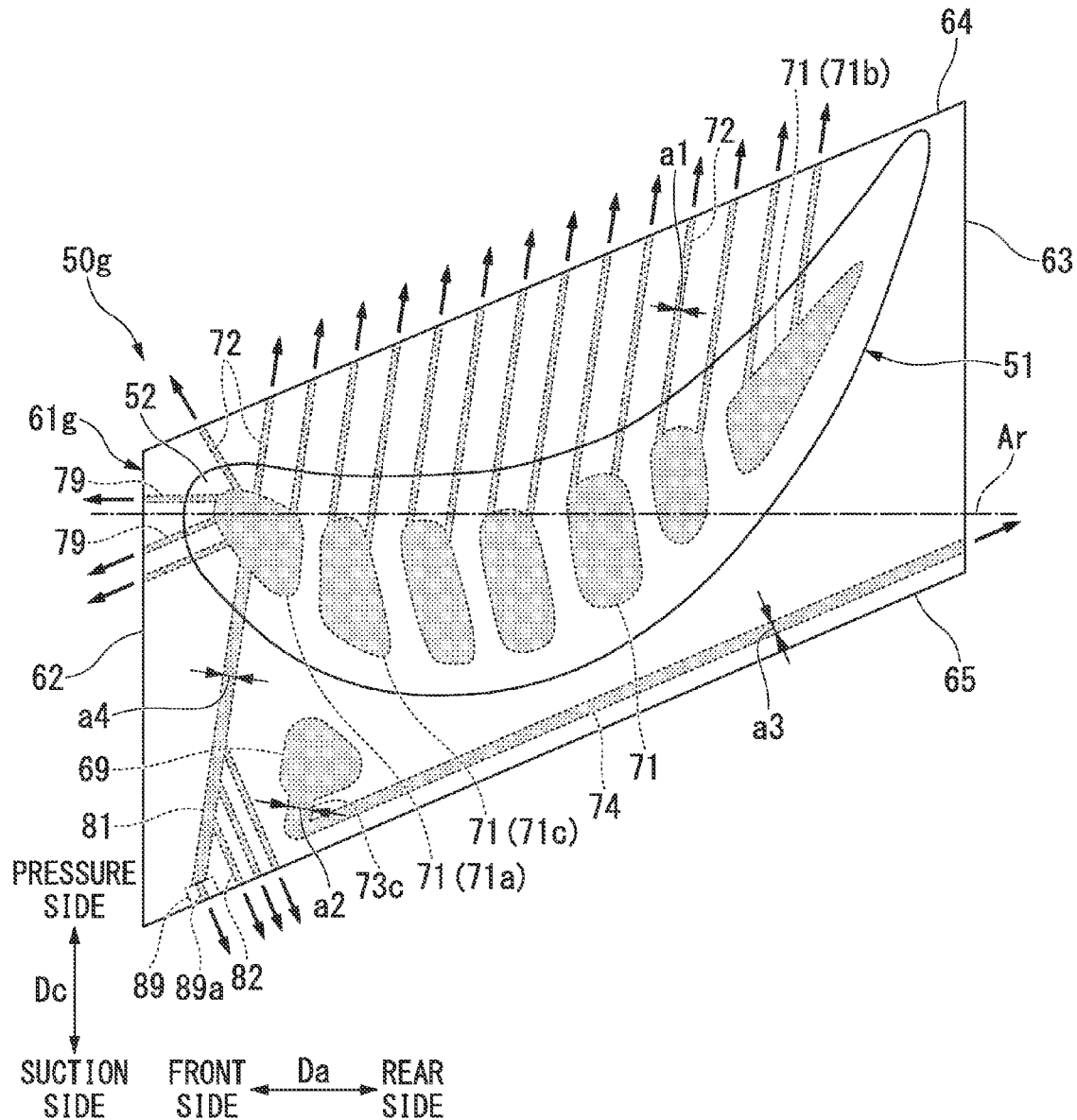
FIG. 18 shows a plane view of a blade in a seventh modified example of the embodiment according to the present invention.

A seventh modified example of the blade according to the present invention will be described using FIG. 18.

A blade 50g of the present modified example is modified from the blade 50f of the sixth modified example.

In the blade 50g of the present modified example, a main passage 81 that extends from the first blade air passage 71a toward the circumferential suction side and a plurality of passages 82 that extend from the main passage 81 toward the suction side end face 65 and are open at the suction side end face 65 are added to the blade 50f of the sixth modified example, while the other constitutions are basically the same as those of the sixth modified example.

Here, a suction side main passage 73c extending from the recess 69 toward the suction side in the circumferential direction Dc is defined as a first suction side main passage 73c, and the suction side passage 74 extending from this first suction side main passage 73c toward the rear side is defined as a first suction side passage 74. Also, the main passage 81 extending from the first blade air passage 71a toward the circumferential suction side is defined as a second suction side main passage 81, and the plurality of passages 82 extending from the second suction side main passage 81 toward the suction side end face 65 are defined as second suction side passages 82.

The second suction side main passage 81 has an opening at the suction side end face 65 of the platform 61g. This opening is blocked by a lid 89, and the lid 89 and an edge of the opening are joined by, for instance, brazing. As described above using FIG. 13, this lid 89 may also be formed with a through-hole 89a that passes from the inside of the second suction side main passage 81 to the outside of the platform 61g.

Similarly to the above embodiment and each of the modified examples, the cross-sectional area a3 of the first suction side passage 74 is greater than the cross-sectional areas a1 of the pressure side passages 72. Also, like the fourth modified example, the cross-sectional area a2 of the first suction side main passage 73c may be made greater than the cross-sectional area a3 of the first suction side passage 74. A cross-sectional area a4 of the second suction side main passage 81 is greater than the cross-sectional areas a1 of the pressure side passages 72, and is approximately the same as the cross-sectional area a3 of the first suction side passage 74.

In the present modified example, cooling air from the first blade air passage 71a flows out of the suction side end face 65 of the platform 61g from the second suction side main passage 81 and the plurality of second suction side passages 82. Therefore, in the present modified example, it is possible to cool the front side of the suction side end face 65 of the platform 61g more than in the sixth modified example.

In the present modified example, the passages extending from the second suction side main passage 81 toward the suction side end face 65 are formed. However, with these passages or without forming these passages, passages that extend from the second suction side main passage 81 toward the front end face 62 and are open at the front end face 62 may be formed.

Here, the first suction side main passage 73c also communicates with the recess 69. However, as previously described, the first suction side main passage 73c may communicate with the second blade air passage 71c.

(Eighth Modified Example of Blade)

Figure 19:
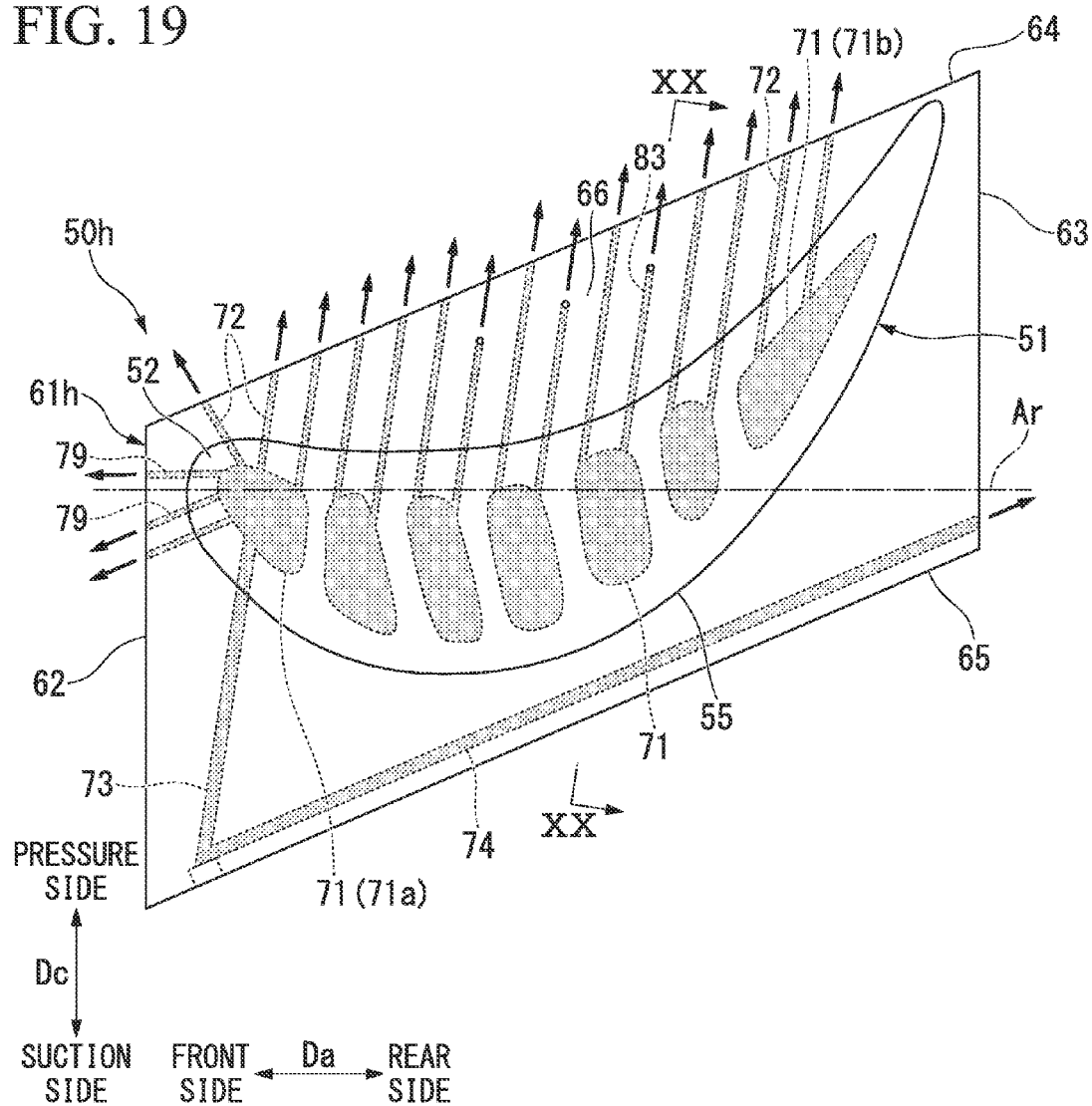
FIG. 19 shows a plane view of a blade in an eighth modified example of the embodiment according to the present invention.
Figure 20:
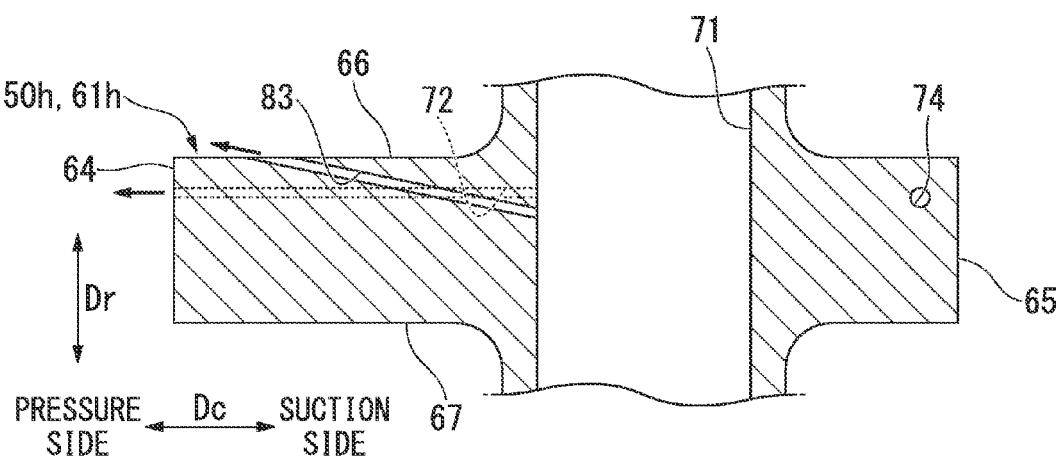
FIG. 20 shows a sectional view taken along line XX-XX in FIG. 19.

An eighth modified example of the blade according to the present invention will be described using FIGS. 19 and 20.

In a blade 50h of the present modified example, some of the plurality of pressure side passages 72 in the blade 50 of the above embodiment are changed into second pressure side passages 83 that are open at the gas path surface 66 of a platform 61h, while the other constitutions are the same as those of the above embodiment. Hereinafter, the pressure side passages 72 that are open at the pressure side end face 64 of the platform 61h just like the above embodiment are defined as first pressure side passages 72.

The second pressure side passages 83 communicate with the blade air passages 71. As they approach to the pressure side, the second pressure side passages 83 are gradually inclined with respect to the gas path surface 66 in a direction in which they approach the gas path surface 66. Cooling air flowing from the blade air passages 71 through the second pressure side passages 83 to the outside of the platform 61h flows along the gas path surface 66. For this reason, in the present modified example, the gas path surface 66 is subjected to film cooling by the cooling air flowing out of the second pressure side passages 83.

(Examples of Combination of the Modified Examples)

The first modified example employs the constitution (hereinafter referred to as "characteristic constitution 1a") in which the interval between the openings adjacent to each other at the front side portion of the pressure side end face 64 of the platform 61a is narrower than that between the openings adjacent to each other at the intermediate portion of this pressure side end face 64 in the axial direction Da. Also, the first modified example employs the constitution (hereinafter referred to as "characteristic constitution 1b") in which the interval between the openings adjacent to each other at the front end face 62 of the platform 61a is narrower than that between the openings adjacent to each other at the intermediate portion of the pressure side end face 64 of the platform 61a in the axial direction Da. At least one of the characteristic constitutions 1a and 1b may be employed in the second and subsequent modified examples and combinations thereof as well.

The second modified example employs the constitution (hereinafter referred to as "characteristic constitution 2") in which the interval between the openings adjacent to each other at the rear side portion of the pressure side end face 64 of the platform 61b is narrower than that between the openings adjacent to each other at the intermediate portion of this pressure side end face 64 in the axial direction Da. The characteristic constitution 2 may be employed in the modified examples other than the second modified example and combinations thereof as well.

The third modified example employs the constitution (hereinafter referred to as "characteristic constitution 3") in which the front side main passage 75 communicating with the first blade air passage 71a, the plurality of pressure front side passages 76 communicating with this front side main passage 75, and the plurality of front pressure side passages 77 communicating with this front side main passage 75 are provided. The characteristic constitution 3 may be employed in the modified examples other than the third modified example and combinations thereof as well.

Also, in the foregoing modified examples and combinations thereof, when a plurality of separate passages are branched from a certain passage and an opening of the certain passage acting as a main passage is blocked by a lid, the constitution (hereinafter referred to as "characteristic constitution 3a") in which the lid blocking the opening of the passage is formed with a through-hole as described using FIG. 13 may be employed.

The fourth modified example employs the constitution (hereinafter referred to as "characteristic constitution 4") in which the cross-sectional area a2 of the suction side main passage 73 is greater than the cross-sectional area a3 of the suction side passage 74. The characteristic constitution 4 may be employed in the modified examples other than the fourth and seventh modified examples and combinations thereof as well.

The fifth modified example employs the constitution (hereinafter referred to as "characteristic constitution 5") in which the plurality of suction side branch passages 78 are branched from the suction side passage 74. The characteristic constitution 5 may be employed in the modified examples excluding the fifth modified example and combinations thereof as well.

The sixth modified example employs the constitution (hereinafter referred to as "characteristic constitution 6") in which the recess 69 and the suction side main passage 73b of the platform 61f communicate with each other. The characteristic constitution 6 may be employed in the modified examples excluding the sixth and seventh modified examples and combinations thereof as well.

The seventh modified example employs the constitution ("characteristic constitution 7") in which the second suction side main passage 81 and the second suction side passages 82 are provided in the modified example having the characteristic constitution 6. The characteristic constitution 7 may be employed in a modification designed to have the characteristic constitution 6 by combining the characteristic constitutions of a plurality of modified examples other than the seventh modified example.

The eighth modified example employs the constitution (hereinafter referred to as "characteristic constitution 8") in which the second pressure side passages 83 are provided. The characteristic constitution 8 may be employed in the modified examples other than the eighth modified example and combinations thereof as well.

Figure 21:
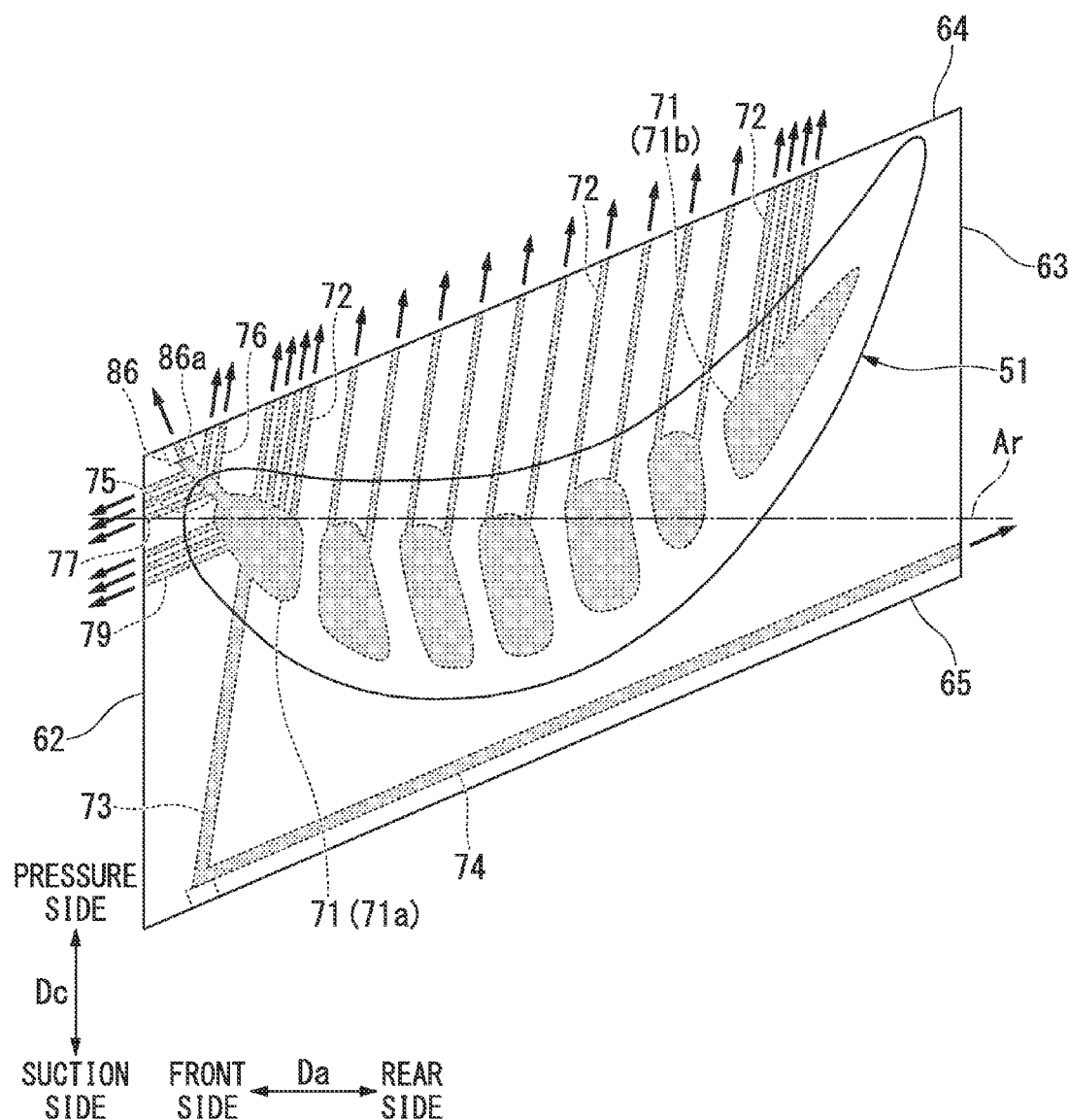
FIG. 21 shows a plane view of a blade in a ninth modified example of the embodiment according to the present invention.

As described above, the characteristic constitutions of the plurality of modified examples may be appropriately combined. For example, like a ninth modified example shown in FIG. 21, the characteristic constitution 2 of the second modified example and the characteristic constitutions 3 and 3a of the third modified example may be employed in the above embodiment. In this case, the characteristic constitution 2 and the characteristic constitution 3a do not have to be employed. Also, in place of the characteristic constitution 3, the characteristic constitution 1 may be employed. In this case, the characteristic constitution 4 of the fourth modified example, the characteristic constitution 5 of the fifth modified example, the characteristic constitution 6 of the sixth modified example, the characteristic constitution 7 of the seventh modified example, and the characteristic constitution 8 of the eighth modified example may be further employed.

Figure 22:
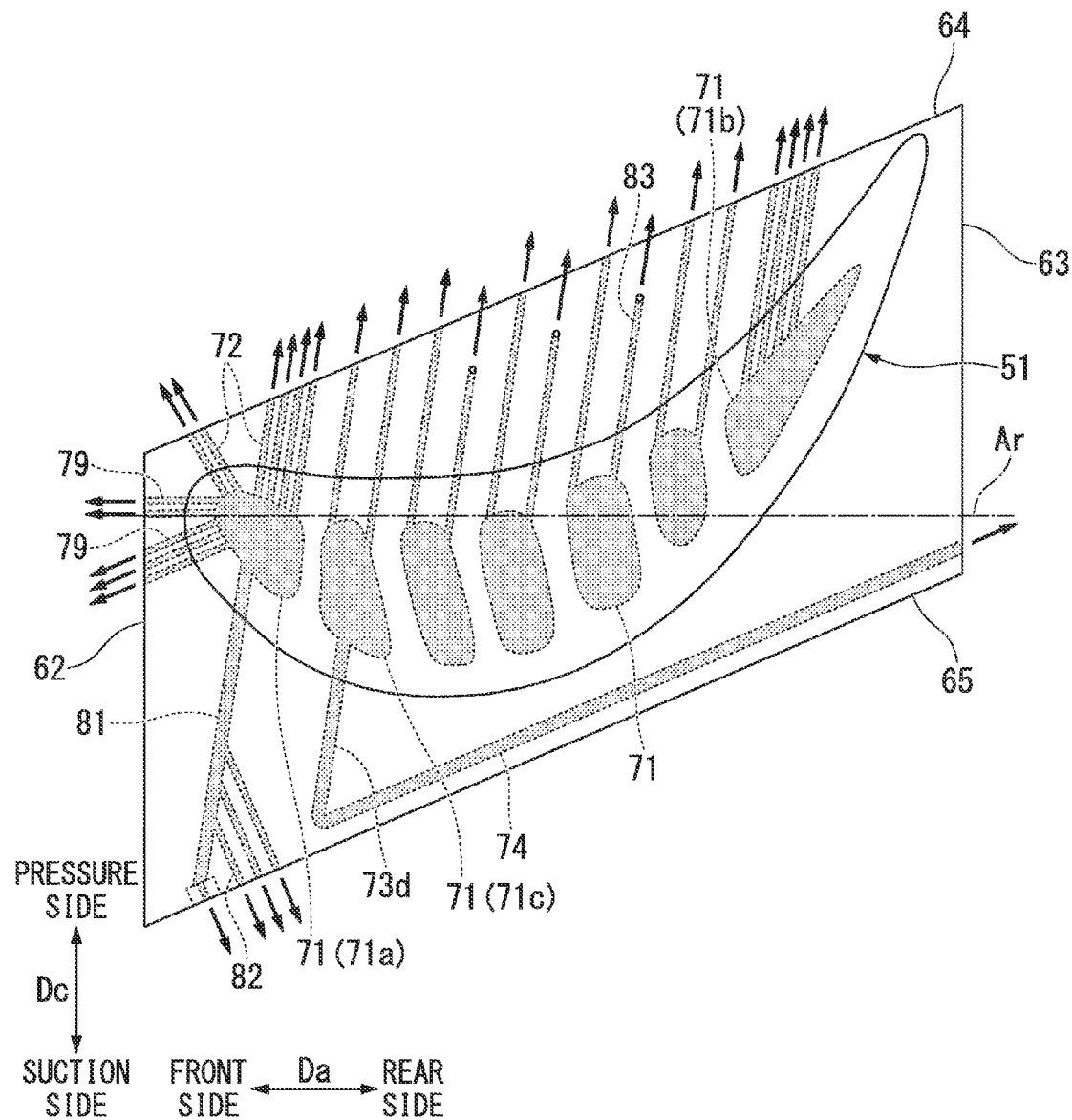
FIG. 22 shows a plane view of a blade in a tenth modified example of the embodiment according to the present invention.

Also, for example, like a tenth modified example shown in FIG. 22, the characteristic constitution 1 of the first modified example, the characteristic constitution 2 of the second modified example, the characteristic constitution 6 of the sixth modified example, the characteristic constitution 7 of the seventh modified example, and the characteristic constitution 8 of the eighth modified example may be employed in the above embodiment. In this case, the characteristic constitutions 2, 7 and 8 do not have to be employed. Also, in place of the characteristic constitution 1, the characteristic constitution 3 may be employed. In this case, the characteristic constitution 5 of the fifth modified example, etc. may be appropriately employed. In the tenth modified example shown in FIG. 22, a constitution in which the second blade air passage 71c and a first suction side main passage 73d communicate with each other is employed as the characteristic constitution 6. Also, in the tenth modified example, the cross-sectional area of the first suction side main passage 73d and the cross-sectional area of the first suction side passage 74 are equal to each other. However, like the characteristic constitution 4 of the fourth modified example, the cross-sectional area of the first suction side main passage 73d may be made greater than the cross-sectional area of the first suction side passage 74.

INDUSTRIAL APPLICABILITY

In an aspect of the present invention, it is possible to suppress the usage of the cooling air while improving the durability of the blade.

REFERENCE SIGNS LIST

10: gas turbine,
11: gas turbine rotor,
15: gas turbine casing,
20: compressor,
21: compressor rotor,
25: compressor casing,
30: combustor,
40: turbine,
41: turbine rotor,
42: rotor shaft,
42p: cooling air passage,
43: blade stage,
45: turbine casing,
46: vane stage,
46a: vane,
50, 50a, 50b, 50c, 50d, 50e, 50f, 50g, 50h: blade,
51: blade body,
52: leading edge,
53: trailing edge,
54: pressure side,
55: suction side,
58: shank,
59: blade root,
61, 61a, 61b, 61c, 61d, 61e, 61f, 61g, 61h: platform,
62: front end face,
63: rear end face,
64: pressure side end face,
65: suction side end face,
66: gas path surface,
67: inner surface,
71: blade air passage,
71a: first blade air passage,
71b: seventh blade air passage,
71c: second blade air passage,
72: pressure side passage (first pressure side passage),
73, 73a, 73b, 73c, 73d: suction side main passage (first suction side main passage),
74: suction side passage (first suction side passage),
75: front side main passage,
76: pressure front side passage,
77: front pressure side passage,
78: suction side branch passage,
79: front side passage,
81: second suction side main passage,
82: second suction side passage,
83: second pressure side passage,
85, 86, 87, 88, 89: lid,
86a, 89a: through-hole.

The invention claimed is:

1. A blade configured to be mounted at an outer circumferential side of a rotor shaft, the blade comprising:
 a blade body configured to extend in a radial direction of the rotor shaft; and
 a platform formed at a radially inner side of the blade body and configured to define a radially inner side of a combustion gas flow channel through which a combustion gas flows,
 wherein:
 the blade body and the platform are formed with blade air passages through which cooling air flows which extend in the radial direction and connect an inside of the blade body and an inside of the platform, and
 the platform is formed with:
 a rear end face that is an end face at an axially downstream side in an axial direction in which the rotor shaft extends and in which the combustion gas flows, a front end face that is an end face at an axially upstream side opposite to the axially downstream side, a pressure side end face that is an end face at a circumferential pressure side that is a pressure side of the blade body in a circumferential direction of the rotor shaft, and a suction side end face that is an end face at a circumferential suction side opposite to the circumferential pressure side;

a front side main passage that is a main passage that extends from a first of the blade air passages that is furthest upstream in the axial direction toward the axially upstream side while being directed to the circumferential pressure side;

a plurality of pressure front side passages extending from the front side main passage toward the circumferential pressure side and being open at the pressure side end face;

one or more front pressure side passages extending from the front side main passage toward the axially upstream side and being open at the front end face; and pressure side passages extending from the blade air passages toward the circumferential pressure side, being open at the pressure side end face, and being arranged in the axial direction, wherein the pressure front side passages are arranged in the axial direction; and wherein an interval between openings of the pressure front side passages adjacent to each other at the pressure side end face is narrower than an interval between openings of the pressure side passages adjacent to each other at an intermediate portion of the pressure side end face in the axial direction.

2. A blade configured to be mounted at an outer circumferential side of a rotor shaft, the blade comprising:

a blade body configured to extend in a radial direction of the rotor shaft; and a platform formed at a radially inner side of the blade body and configured to define a radially inner side of a combustion gas flow channel through which a combustion gas flows, wherein:

the blade body and the platform are formed with blade air passages through which cooling air flows which extend in the radial direction and connect an inside of the blade body and an inside of the platform, and the platform is formed with:

a rear end face that is an end face at an axially downstream side in an axial direction in which the rotor shaft extends and in which the combustion gas flows, a front end face that is an end face at an axially upstream side opposite to the axially downstream side, a pressure side end face that is an end face at a circumferential pressure side that is a pressure side of the blade body in a circumferential direction of the rotor shaft, and a suction side end face that is an end face at a circumferential suction side opposite to the circumferential pressure side;

a front side main passage that is a main passage that extends from a first of the blade air passages that is furthest upstream in the axial direction toward the axially upstream side while being directed to the circumferential pressure side;

one or more pressure front side passages extending from the front side main passage toward the circumferential pressure side and being open at the pressure side end face;

a plurality of front pressure side passages extending from the front side main passage toward the axially upstream side and being open at the front end face; and pressure side passages extending from the blade air passages toward the circumferential pressure side, being open at the pressure side end face, and being arranged in the axial direction, wherein the front pressure side passages are arranged in the circumferential direction; and wherein an interval between openings of the front pressure side passages adjacent to each other at the front end face is narrower than an interval between the openings of the pressure side passages adjacent to each other at an intermediate portion of the pressure side end face in the axial direction.

3. The blade according to claim 2, wherein a shortest distance between a leading edge of the blade body and the front end face is shorter than a shortest distance between a suction side portion of the blade body and the suction side end face.

4. A blade configured to be mounted at an outer circumferential side of a rotor shaft, the blade comprising:

a blade body configured to extend in a radial direction of the rotor shaft; and a platform formed at a radially inner side of the blade body and configured to define a radially inner side of a combustion gas flow channel through which a combustion gas flows, wherein:

the blade body and the platform are formed with blade air passages through which cooling air flows which extend in the radial direction and connect an inside of the blade body and an inside of the platform, and the platform is formed with:

a rear end face that is an end face at an axially downstream side in an axial direction in which the rotor shaft extends and in which the combustion gas flows, a front end face that is an end face at an axially upstream side opposite to the axially downstream side, a pressure side end face that is an end face at a circumferential pressure side that is a pressure side of the blade body in a circumferential direction of the rotor shaft, and a suction side end face that is an end face at a circumferential suction side opposite to the circumferential pressure side;

a front side main passage that is a main passage that extends from a first of the blade air passages that is furthest upstream in the axial direction toward the axially upstream side while being directed to the circumferential pressure side;

one or more pressure front side passages extending from the front side main passage toward the circumferential pressure side and being open at the pressure side end face;

one or more front pressure side passages extending from the front side main passage toward the axially upstream side and being open at the front end face; and a plurality of pressure side passages extending from the blade air passages toward the circumferential pressure side, being open at the pressure side end face, and being arranged in the axial direction, a suction side main passage into which the cooling air flows and which is a main passage having an end located at the circumferential suction side from the blade body, and a suction side passage that communicates with the suction side main passage and extends from the suction side main passage along the suction side end face in a direction having a component of the axial direction.

* * * * *